US011227420B2

(12) United States Patent
Raut et al.

(10) Patent No.: US 11,227,420 B2
(45) Date of Patent: *Jan. 18, 2022

(54) HAZARD WARNING POLYGONS CONSTRAINED BASED ON END-USE DEVICE

(71) Applicant: HERE Global B.V., Eindhoven (NL)

(72) Inventors: Advait Mohan Raut, Virar West (IN); Leon Stenneth, Chicago, IL (US); Ram Marappan, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,266

(22) Filed: Apr. 20, 2020

(65) Prior Publication Data

US 2020/0250864 A1   Aug. 6, 2020

Related U.S. Application Data

(63) Continuation of application No. 16/043,933, filed on Jul. 24, 2018, now Pat. No. 10,657,683.

(51) Int. Cl.
 *G06T 11/20*  (2006.01)
 *G01C 21/36*  (2006.01)
 *G08G 1/0967*  (2006.01)
 *G01C 21/00*  (2006.01)

(52) U.S. Cl.
 CPC ........ *G06T 11/203* (2013.01); *G01C 21/3694* (2013.01); *G08G 1/0967* (2013.01)

(58) Field of Classification Search
 None
 See application file for complete search history.

(56) References Cited

U.S. PATENT DOCUMENTS

| 5,363,107 | A | 11/1994 | Gertz et al. |
| 9,224,218 | B2 | 12/2015 | Pahwa et al. |
| 9,842,442 | B2 | 12/2017 | Konicek et al. |
| 10,382,889 | B1 | 8/2019 | Ajmeri et al. |
| 2002/0067289 | A1 | 6/2002 | Smith |
| 2007/0139411 | A1 | 6/2007 | Jawerth et al. |
| 2008/0300779 | A1* | 12/2008 | Uhlmann ............... G01C 21/32 701/532 |
| 2011/0153368 | A1 | 6/2011 | Pierre et al. |
| 2013/0009780 | A1 | 1/2013 | Marshall et al. |

(Continued)

OTHER PUBLICATIONS

Daly, Brian K., et al. "Geographic Targeting, Message Content and Character Limitation Subgroup Report." (2014).

*Primary Examiner* — Yingchun He
(74) *Attorney, Agent, or Firm* — Lempia Summerfield Katz LLC

(57) ABSTRACT

An apparatus is configured to perform a method for generating warning polygons for weather events in a geographic region. The method includes receiving measurement data from one or more sensors, identifying at least one location from the measurement data, identifying a map tile within a predetermined distance to the at least one location, generating a map tile cluster based on analysis of the at least one map tile, accessing an end-use constraint of the end-use device, the end-use constraint indicative of a constraint in processing on the end-use device, and calculating the warning polygon based on the map tile cluster and based on the end-use constraint such that the polygon intersects the geographic region.

18 Claims, 34 Drawing Sheets

(56) References Cited

U.S. PATENT DOCUMENTS

2014/0081517 A1    3/2014   Barrett et al.
2017/0039765 A1    2/2017   Zhou et al.
2018/0014161 A1    1/2018   Warren et al.
2018/0084083 A1    3/2018   Levanon et al.

* cited by examiner

Unconstrained polygon
Number of vertices: 300

Constrained polygon
Number of vertices: 200

Constrained polygon
Number of vertices: 150

Unconstrained polygon
Number of vertices: 68

Constrained polygon
Number of vertices: 35

Constrained polygon
Number of vertices: 16

Unconstrained polygon
Number of vertices: 36

Constrained polygon
Number of vertices: 19

Constrained polygon
Number of vertices: 12

HAZARD WARNING POLYGONS CONSTRAINED BASED ON END-USE DEVICE

CROSS REFERENCE TO PRIOR APPLICATION

This application is a continuation under 35 U.S.C. § 120 and 37 C.F.R. § 1.53(b) of U.S. patent application Ser. No. 16/043,933 filed Jul. 24, 2018, which is hereby incorporated by reference in its entirety.

FIELD

The following disclosure relates to the calculation of polygons for geographic areas corresponding to weather events from sensor data associated with a vehicle.

BACKGROUND

Driving conditions change very quickly. The path of a rain storm, fog, or other weather conditions moves across different roadways in a geographic area in different ways and in different coverage areas. These weather conditions can be hazardous to drivers. The weather conditions may be detected by sensors at some vehicles. Warnings may be provided to other vehicles. When warnings can be delivered to drivers, the drivers can prepare for the upcoming conditions. Drivers may choose to slow down, change lanes, exit the road, or stop on the shoulder. Safety is improved, and accidents are avoided.

Warnings are delivered to drivers via connected navigation systems and can be displayed on the head unit screen, cluster screen or a heads-up display. The affected region for the warnings may also be rendered at the vehicle navigation system. However, with limited computing resources, the navigation system can be improved with more efficient rendering of the affected region.

SUMMARY

In one embodiment, a method for generating warning polygons constrained to an end-use (or end-user) device, with the warning polygons indicative of hazard events in a geographic region, is disclosed. The method includes receiving measurement data from one or more sensors associated with the geographic region, identifying at least one location from the measurement data, identifying at least one map tile within a predetermined distance to the at least one location, generating a map tile cluster based on analysis of the at least one map tile, accessing an end-use constraint of the end-use device, with the end-use constraint indicative of a constraint in processing on the end-use device, and calculating, by a processor, the warning polygon based on the map tile cluster and based on the end-use constraint, wherein the warning polygon intersects the geographic region.

In one embodiment, an apparatus for generating warning polygons constrained to an end-use device, with the warning polygons indicative of hazard events in a geographic region, is disclosed. The apparatus includes a map tile database configured to store partitions of map data according to an index of a plurality of map tile identifiers, an input configured to receive measurement data from one or more sensors associated with the geographic region, and a controller in communication with the map tile database and the input. The controller is configured to: identify at least one location from the measurement data; identify, from the map tile database, at least one map tile within a predetermined distance to the at least one location; generate a map tile cluster based on analysis of the at least one map tile; access an end-use constraint of the end-use device, the end-use constraint indicative of a constraint in processing on the end-use device; and calculate the warning polygon based on the map tile cluster and based on the end-use constraint, wherein the warning polygon intersects the geographic region.

In one embodiment, a non-transitory computer readable medium including instructions that when executed cause a processor to perform detecting, from a first sensor, location data for a geographic location of a vehicle, detecting, from a second sensor, measurement data associated with the vehicle, sending, to a centralized device, an event message including the location data and the measurement data, receiving a hazard event polygon from the centralized device, the hazard event polygon constrained based on an end-use device in the vehicle, and outputting, using the end-use device, a driving message to the vehicle in response to receipt of the hazard event polygon.

BRIEF DESCRIPTION OF THE DRAWINGS

Exemplary embodiments of the present invention are described herein with reference to the following drawings.

DETAILED DESCRIPTION

Figure 1A:
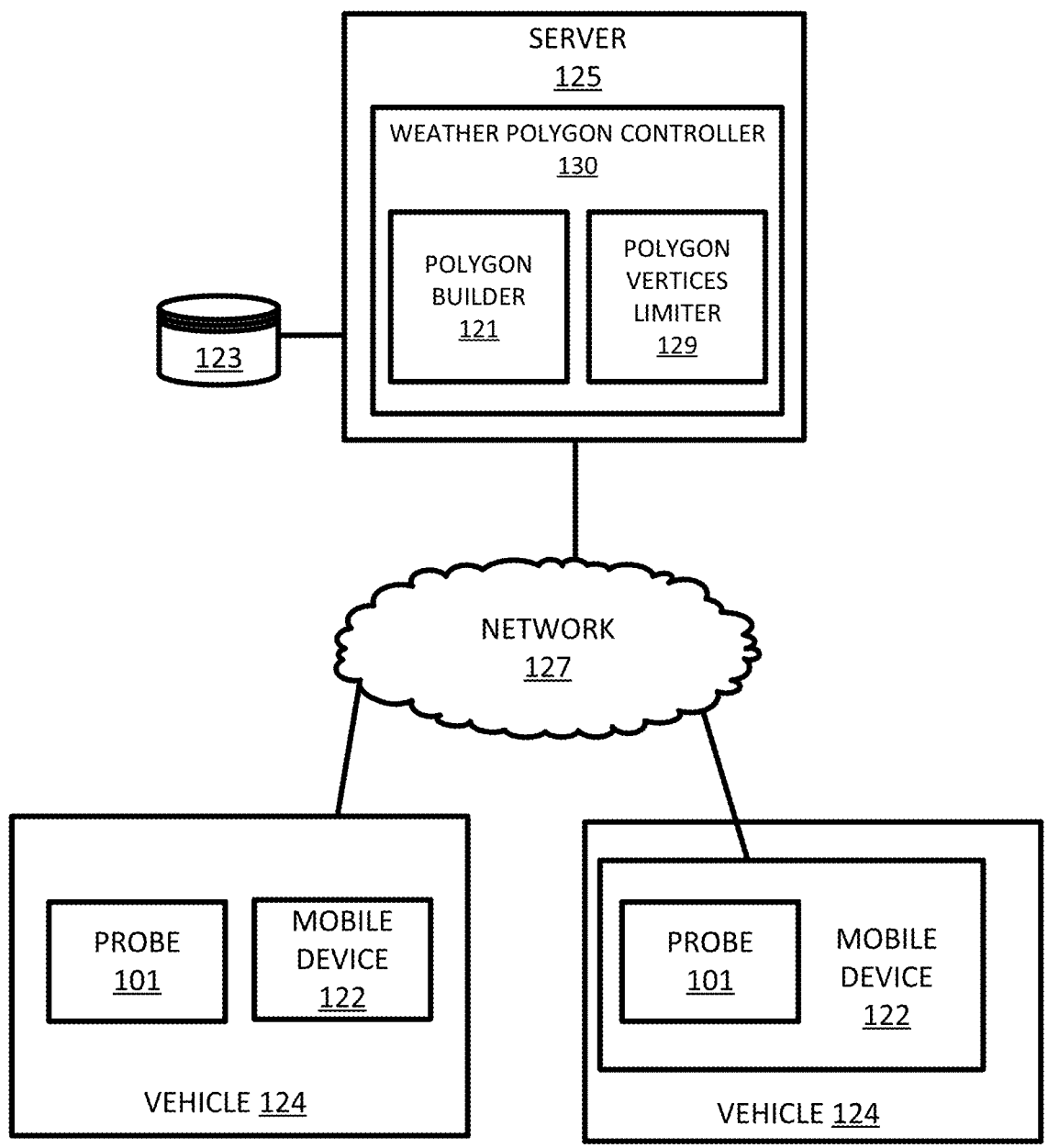
FIG. 1A illustrates a first example system for generating vertices-limited weather polygons from vehicle observations.

Driving hazards, or driving conditions, which may be indicative of hazard events, may be communicated to drivers or automated driving systems based on data observations collected by other vehicles. The observations may be collected by pedestrians or other mobile devices in other scenarios. The driving conditions may be presented as a geometric shape on a geographic map that illustrates the affected area. Alternatively, the driving conditions may be communicated using a displayed or audible warning of an area affected. In this regard, the data observations collected may be derived from one or more sources, such as sensor data generated by a sensor associated with a vehicle and/or sensor data generated by a sensor separate from the vehicle (e.g., a mobile device traveling in the vehicle or outside of the vehicle). While traveling in the affected area, the warning indicative of the hazard event may be repeated. The user may view the map to recognize the driving condition and adjust operation of the vehicle according. The driver may choose to drive more slowly, pay closer attention, activate one or more system to accommodate the condition, stop driving, change lanes, change roadways, or another response. An automated driving system may response to the driving condition with similar responses.

Example driving conditions may include rain, fog, precipitation, snow conditions, ice conditions, or other weather events. Vehicle observations of these weather events, even when sparse date, may reliably detect the region that is affected by the hazards. As one example, a vehicle may sense its own wiper blade status (e.g., whether the wiper blades are activated) and/or its own fog lights status (e.g., whether the fog lights are activated) in order to determine rain, precipitation, snow conditions, ice conditions, or other weather events. As another example, the vehicle may detect the status of other vehicles in order to detect a weather event. Specifically, to detect precipitation, vehicle observations of wiper blade status signals may be sufficient to detect the coverage area of precipitation. Further, to detect fog, vehicle observations of fog lights (e.g., rear fog lights) may be sufficient to detect the coverage area of the fog.

The affected area may be represented by a polygon, which is generated for display on an end-use device, such as in an electronic device associated with the vehicle (e.g., the vehicle navigation system in the head-unit of the vehicle) or in an electronic device within the vehicle (e.g., a mobile smartphone that is within the vehicle). However, the end-use device may have one or more constraints, such as one or more computing resource constraints (e.g., processing capability, memory size constraints, display constraints, etc.). Thus, the end-use device may crash or fail to operate properly if the end-use device processes a polygon that exceeds its constraints. Thus, polygons are sought that have as few edges as possible and be constructed from as few calculations as possible. The following embodiments improve the technological fields of navigation, automated driving, and automatic vehicle safety mechanisms by reducing the number of calculations and computing resources needed to construct polygons for the driving condition warnings.

For example, a first type of vehicle (or first vehicle manufacturer) may have a vehicle navigation system that has a first set of constraints, whereas a second type of vehicle (or second vehicle manufacturer) may have a vehicle navigation system that has a second set of constraints. Specifically, the in-dash navigation system for the first type of vehicle may have different display capabilities than the in-dash navigation system for the second type of vehicle (e.g., vehicles from first vehicle manufacturer cannot display area hazards represented as polygons if the number of vertices in the polygon exceeds 200).

In one implementation, the polygons generated may be constrained based on the one or more constraints of the end user device. For example, the number of vertices in the polygon may be constrained to be no more than a maximum vertices limit that the end-use device may process. In a first implementation, the system generates the polygon independent of any constraints of the end-use device (e.g., generates an unconstrained warning polygon). After which, the system may determine whether the unconstrained warning polygon is contrary to any end-use device constraint. For example, the system may first generate an unconstrained warning polygon that is defined by a set of vertices, with the number of vertices in the set of vertices equaling 500. The system may determine that the end-use device can process polygons with no more than 200 vertices. Responsive to the system determining that the unconstrained warning polygon includes a number of vertices that exceeds the maximum vertices limit of the end-use device, the system may reduce the number of vertices for the unconstrained warning polygon to be no more than the maximum vertices limit, thereby generating a constrained warning polygon and at the same time not modifying the shape of the original polygon excessively. The reduction in the number of vertices may be performed without significantly compromising the accuracy of the constrained warning polygon, as compared with the unconstrained warning polygon.

The reduction of the number of vertices for the unconstrained warning polygon may be performed in one of several ways. In one way, the system may generate the constrained warning polygon by building the set of vertices in the constrained warning polygon upward (e.g., select two vertices from the set of vertices for the unconstrained warning polygon, thereafter add a third vertex from the set of vertices for the unconstrained warning polygon, and continue adding vertices from the set of vertices for the unconstrained warning polygon until the maximum vertices limit is reached). In another way, the system may generate the constrained warning polygon by reducing the set of vertices in the constrained warning polygon downward (e.g., begin by removing a vertex from the set of vertices for the unconstrained warning polygon, and by continuing to remove vertices until the maximum vertices limit in the set of vertices for the constrained warning polygon is reached). Though the discussion below focuses on constraining the number of vertices in the warning polygon to accommodate end-use device processing constraints, constraining other aspect(s) of the warning polygon is contemplated. In this regard, any discussion below directed to constraining the number of vertices based on processing constraints may be applied to constraining or modifying other aspects of the warning polygon based on end-use device constraint(s).

Referring to the figures, FIG. 1A illustrates a first example system for generating vertices-limited weather polygons from vehicle observations. As discussed above, a weather polygon indicates the geographic location or area affected by a weather condition. The weather polygon may be represented graphically, for example, overlaid on a map such that the polygon is drawn over the area affected by the weather condition. The weather polygon may be represented by a set of vertices or other geographic coordinates that describes the relationship between the polygon and the map.

Figure 3A:
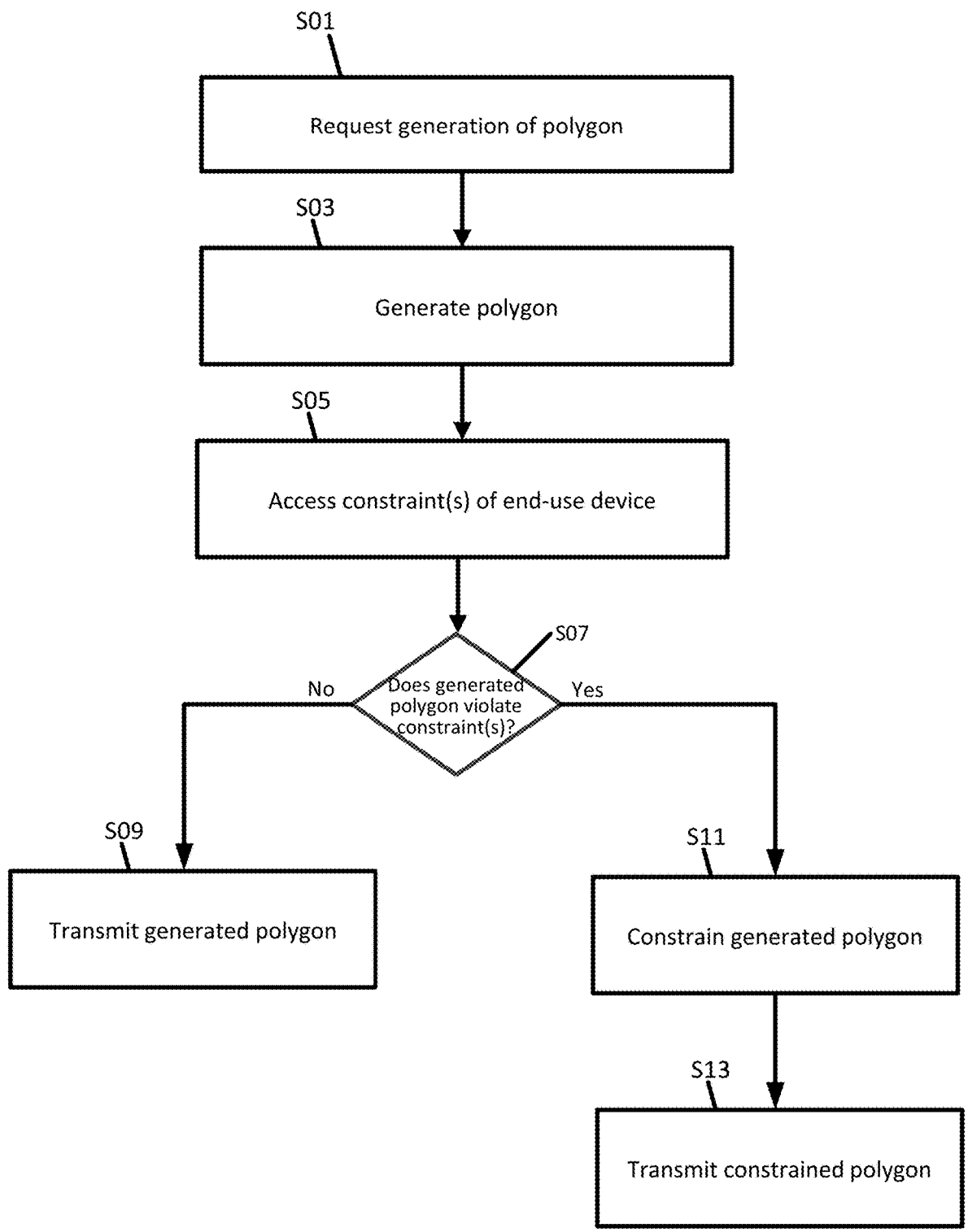
FIG. 3A illustrates a first example flowchart of generating a polygon constrained by end-use device constraints.

In FIG. 1A, one or more vehicles 124 are connected to the server 125 though the network 127. The vehicles 124 may be directly connected to the server 125 or through an associated mobile device 122. A map developer system, including the server 125 and a geographic database 123, exchanges (e.g., receives and sends) data from the vehicles 124. The server 125 may include a weather polygon controller 130. The weather polygon controller 130 includes a polygon builder 121, configured to generate polygons or designated geographic areas for weather events based on crowdsourced data from the vehicles 124, and a polygon vertices limiter 129, configured to limit the vertices in the warning polygon to a predetermined limit (e.g., to be no more than the maximum vertices limit). In particular, the polygon vertices limiter 129 may use information on end-use device constraints, which may be stored in database 123, in order to limit the number of vertices in the polygon. An example of the functionality performed by polygon builder 121 is illustrated in FIG. 3C. An example of the functionality performed by polygon vertices limiter 129 is illustrated in FIG. 3A.

Each vehicle 124 and/or mobile device 122 may include position circuitry such as one or more processors or circuits for generating probe data. The probe data may be generated by receiving global navigation satellite system (GNSS) signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The mobile devices 122 may include local databases corresponding to a local map, which may be modified according to the server 125. The local map may include a subset of the geographic database 123 and are updated or changed as the vehicles 124 travel. For example, polygons may be downloaded to the local map from the geographic database 123 according to location. The mobile devices 122 may request a subset of the geographic database 123 based on the locations detected by position circuitry. The mobile devices 122 may be standalone devices such as smartphones or devices integrated with vehicles. Additional, different, or fewer components may be included.

Figure 1B:
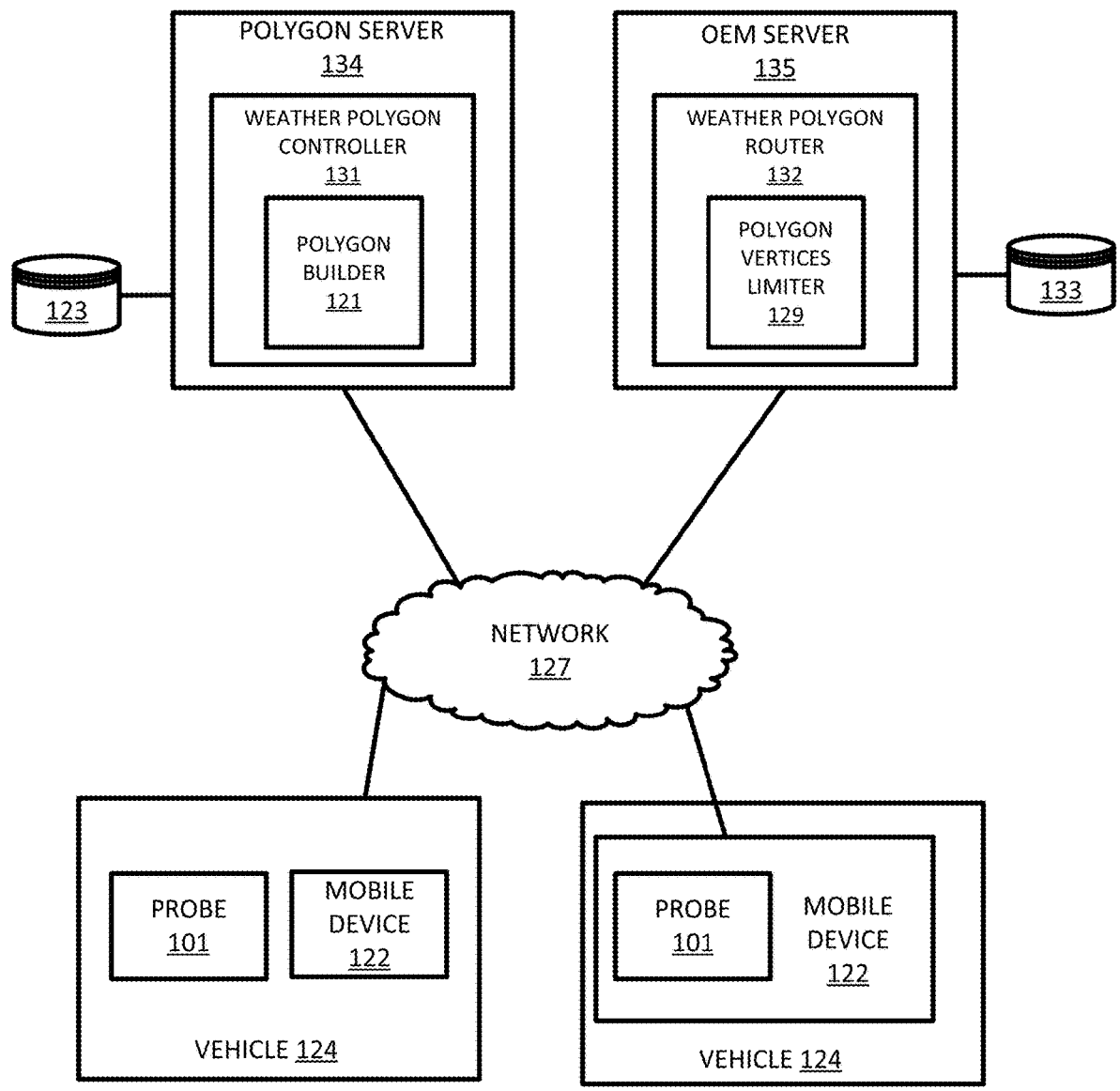
FIG. 1B illustrates a second example system for generating vertices-limited weather polygons from vehicle observations.

FIG. 1B illustrates a second example system for generating vertices-limited weather polygons from vehicle observations. In FIG. 1B, the functionality of weather polygon controller 130 in FIG. 1A is divided, with polygon builder 121 in weather polygon controller 131 in polygon server 134 and with polygon vertices limiter 129 in weather polygon router 132 in an original equipment manufacturer (OEM) server 135. As discussed in more detail with regard to FIG. 2C, multiple servers may be involved in generating and transmitting the polygon to the vehicle. In this regard, the polygon server 134 may generate the unconstrained polygon with the OEM server 135, which may comprise the server requesting the polygon, generating the constrained polygon (to the extent necessary).

Figure 1C:
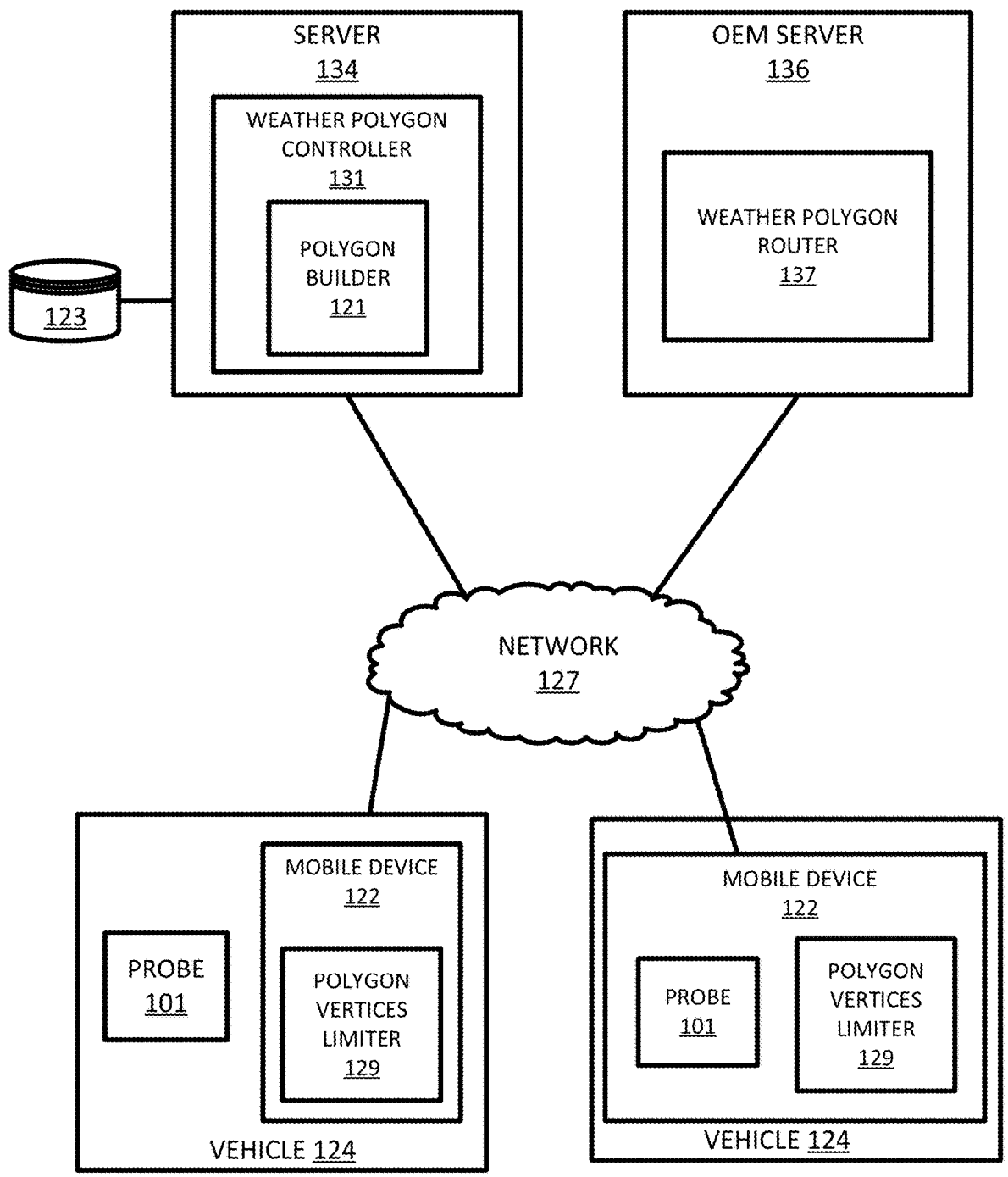
FIG. 1C illustrates a third example system for generating vertices-limited weather polygons from vehicle observations.

FIG. 1C illustrates a third example system for generating vertices-limited weather polygons from vehicle observations. In FIG. 1C, the functionality of weather polygon controller 130 in FIG. 1A is divided, with polygon builder 121 in weather polygon controller 131 in polygon server 134 and with polygon vertices limiter 129 in mobile device 122 of vehicle 124. In this regard, the mobile device 122 receives the unconstrained polygon, routed via weather polygon router 137 in OEM server 136, and determines whether the unconstrained polygon violates one or more constraints of the mobile device 122. If so, the mobile device 122 generates the constrained polygon. As one example, the mobile device 122 may access an end-use constraint of the mobile device (e.g., a maximum vertices limit that the mobile device can process for a weather polygon) in order to determine the received weather polygon exceeds the maximum vertices limit and responsive to determining that the received weather polygon exceeds the maximum vertices limit, reduce the number of vertices to be no more than the maximum vertices limit. In one implementation, the end-use constraint may be static, such as unchanging regardless of operation of the mobile device 122. In another implementation, the end-use constraint may be dynamic, such as changing dependent on operation of the mobile device 122 (e.g., during high-processing events in the mobile device 122, the maximum vertices limit may be lower than during low-processing events in the mobile device 122). In this implementation, the mobile device may access a current operation of the mobile device 122 (e.g., its current processing load) in order to determine the associated end-use constraint of the mobile device 122.

Figure 2A:
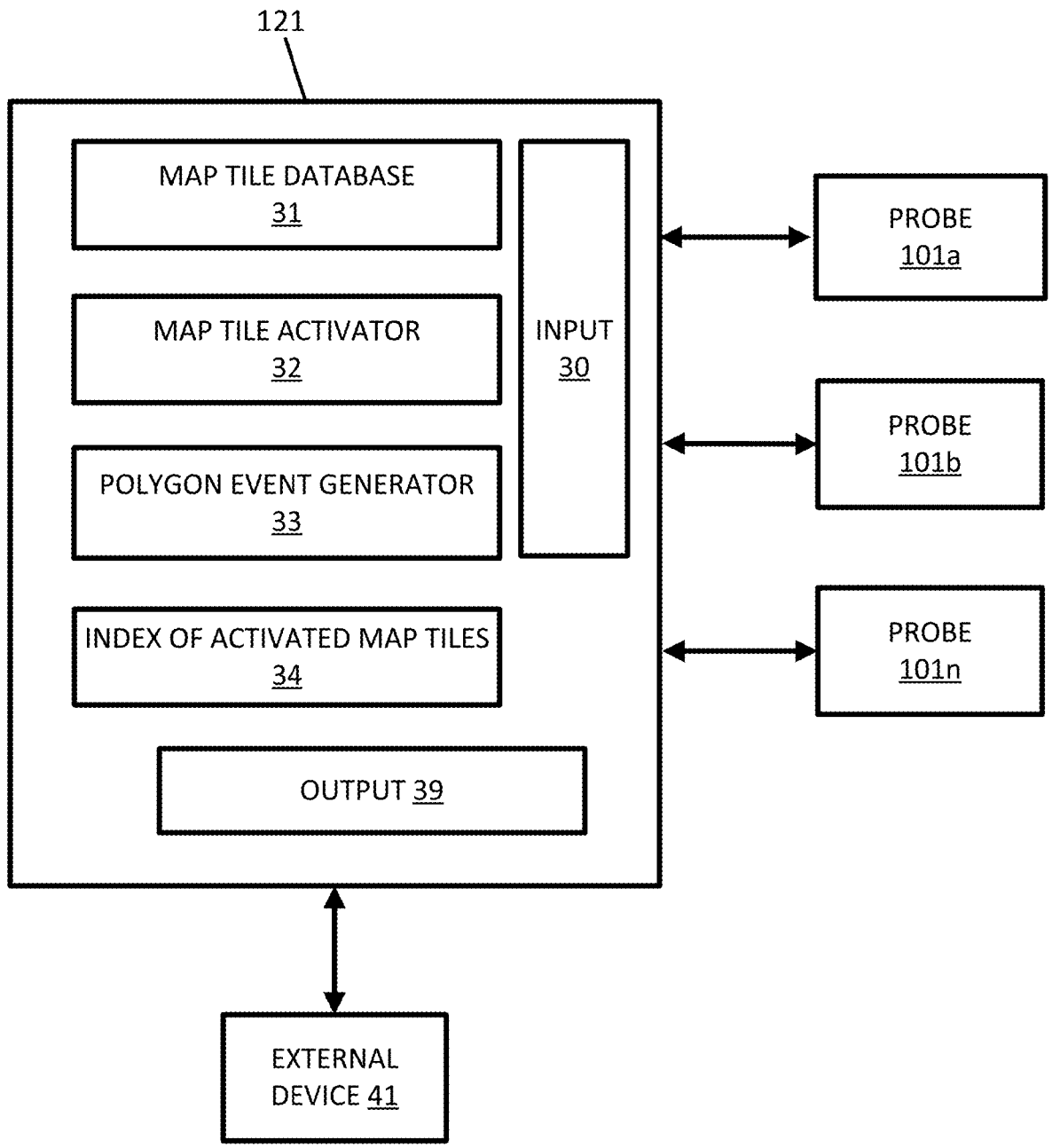
FIG. 2A illustrates an example polygon builder.

FIG. 2A illustrates an example polygon builder 121. The polygon builder 121 may include one or more memory portions, one or more communication portions, and one or more processing portions. Example memory portions include the map tile database 31 and the index of activated map tiles 34. Example communication portions include the input communication device (input 30) for communication with the probes 101a-n and the output communication device (output 39) for communicating with external device 41. Example processing portions include the map tile activator 32, and the polygon generator 35. Additional, different, or fewer components may be included.

Figure 2B:
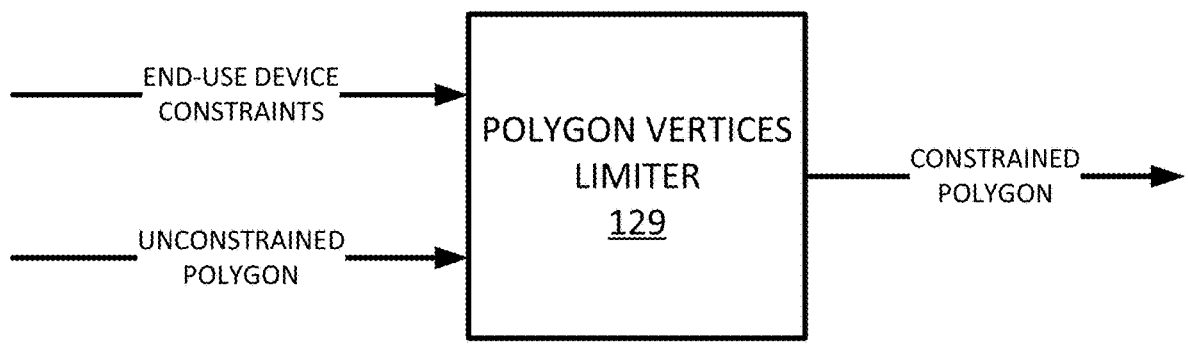
FIG. 2B illustrates a block diagram of the polygon vertices limiter.

FIG. 2B illustrates a block diagram of the polygon vertices limiter 129. As shown, the polygon vertices limiter 129 receives as inputs end-use device constraints and the unconstrained polygon. As output, the polygon vertices limiter 129 outputs the constrained polygon.

Figure 2C:
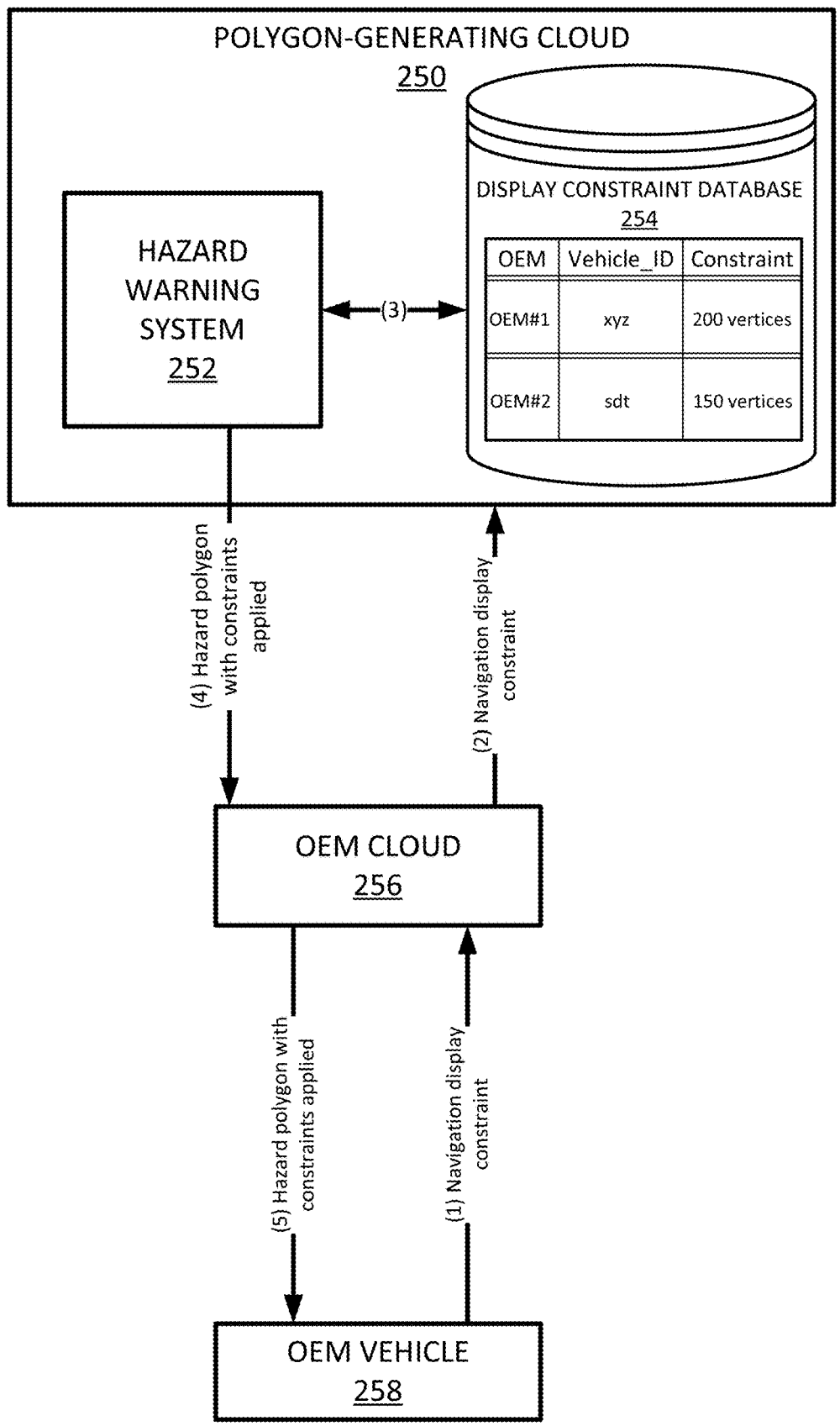
FIG. 2C illustrates a block diagram of a cloud-based polygon building system.

FIG. 2C illustrates a block diagram of a cloud-based polygon building system. At (1), the OEM vehicle 258 sends its constraint(s), such as its in-dash navigation constraints, to the OEM cloud 256. The OEM cloud 256 may perform one or more OEM functionalities, such as anonymization. At (2), the OEM cloud 256 forwards the constraints to the polygon-generating cloud 250. In the polygon-generating cloud 250, the constraints are archived in a digital database, such as display constraint database 254. As illustrated in FIG. 2C, information stored in the database may include: the OEM; vehicle id (or other type of vehicle identifier), and display constraint (e.g., the maximum vertices limit, such as a maximum vertices limit of 150 vertices or 200 vertices).

At (3), the polygon-generating cloud 250 estimates what hazards are on the road (e.g., fog and rain) and draws a polygon that represents the hazards, such as disclosed herein. After determining the polygon of the affected area and before the polygon is sent to the OEM(s), the polygon-generating cloud 250 checks the display constraint database 254. If the constraints of the polygon are below that which is defined in the database, the polygon is sent to OEMs as is and without modification. If the constraints of the polygon is above what is defined in the database, the polygon is modified to meet the constraints in the display constraint database 254 before it is sent to OEMs.

At (4), the hazard warning system 252 sends the polygon that are below the constraint of the vehicle (e.g., a polygon that is capable of been displayed in the vehicle without crashing or otherwise causing an error in the in-dash display) to the OEM. At (5), the OEM cloud 256 forwards the polygon to the OEM vehicle 258. In this way, the polygon transmitted to the OEM vehicle 258 will not crash the in-dash navigation display of the vehicle.

In this regard, FIG. 2C illustrates that the reduction in the number of vertices is performed at polygon-generating cloud 250. Alternatively, the reduction in the number of vertices may be performed external to polygon-generating cloud 250, such as in OEM cloud 256 or in OEM vehicle 258. In the instance where OEM cloud 256 reduces the number of vertices, polygon-generating cloud 250 sends the unconstrained polygon to OEM cloud 256, with OEM cloud 256 determining, based on the constraints of the OEM vehicle 258, whether to reduce the number of vertices. This is illustrated, for example in FIG. 1B. In the instance where OEM vehicle 258 reduces the number of vertices, polygon-generating cloud 250 sends the unconstrained polygon to OEM cloud 256, with OEM cloud 256 routing the unconstrained polygon to OEM vehicle 258. OEM vehicle 258 then determines, based on its constraints, whether to reduce the number of vertices. This is illustrated, for example in FIG. 1C.

FIG. 3A illustrates a first example flowchart of generating a polygon constrained by end-use device constraints. The acts or stages in FIG. 3A may be performed in any order. Certain acts or stages may be performed in parallel. Certain acts or stages are performed automatically in response to one or more prior acts or stages. Additional, different, or fewer acts or stages may be included. At act S01, a request to generate a polygon is generated. The request may originate from the vehicle, the OEM, and/or the polygon-generating server. For example, the vehicle and/or the OEM may request the generation of the polygon. Alternatively or in addition, the polygon-generating server may generate the request unprompted by the vehicle or the OEM. For example, the polygon-generating server may periodically or continuously analyze the incoming data in order to determine whether to generate a polygon.

In one implementation, responsive to the polygon-generating server determining there is a warning polygon, the warning polygon is pushed to one or more vehicles. For example, the polygon-generating server may identify candidate vehicles to receive the warning polygon. In particular, the polygon-generating server may identify the vehicles that are headed in the direction of the warning polygon or currently inside the warning polygon, with the polygon-generating server pushing the warning polygon to the identified vehicles. In an alternate implementation, the warning polygon may be pulled from the polygon-generating server. For example, the warning polygon may be generated (prompted either by the OEM server or the vehicle and/or by the polygon-generating server). Responsive to a request either from the OEM server or the vehicle, the polygon-generating server sends the warning polygon.

At act S03, the polygon is generated, discussed in more detail with regard to FIG. 3C. At act S05, one or more constraints of the end-use device are accessed. The access of the constraints may be performed either before or after generation of the polygon. As discussed above, the access of constraints may be prompted based on information regarding the end-use device. For example, the server may receive information regarding the end-use device, and access the database, which correlates the information with the constraint(s), using the information in order to obtain the constraint(s).

The information regarding the end-use device may take one of several forms and may be sent from one or more devices. As one example, the information regarding the end-use device may comprise a constraint of the end-use device (e.g., the maximum vertices limit). As another example, the information regarding the end-use device may comprise an indication of the end-use device (e.g., a specific model number of the vehicle navigation unit or a specific model number of a smartphone). The indication of the end-use device may be correlated to the constraint of the end-use device (e.g., correlation of the specific model number of the vehicle navigation unit to the maximum vertices limit for the specific model number of the vehicle navigation unit). As still another example, the information regarding the end-use device may comprise a model and/or make of a vehicle in which the end-use device is (e.g., a specific make/model of a vehicle). The model and/or make of a vehicle may be correlated to the constraint of the end-use device (e.g., correlation of the specific model and/or make of a vehicle to the maximum vertices limit for the specific model and/or make of a vehicle). The information regarding the end-use device may be sent from the end-use device or from an intermediate device, such as an OEM server.

At act S07, it is determined whether the polygon generate at act S03 violates the accessed one or more constraints. As one example, it is determined whether the number of vertices in the generated polygon is greater than the maximum vertices limit for the end-use device. If not, the generated polygon is used at the end-use device unmodified. For example, at act S09, the device that generated the polygon may send the unconstrained polygon for ultimate receipt and use by the end-use device.

If the constraint(s) are violated, at act S11, the polygon is constrained in at least one aspect. Thereafter, at act S13, the device that generated the polygon may send the constrained polygon for ultimate receipt and use by the end-use device.

As discussed herein, one aspect to constrain the polygon is to reduce the number of vertices for the polygon. Other aspects to constrain the polygon are contemplated. There are various ways to constrain the number of vertices of the polygon. In one implementation, the system may reduce the number of vertices for the unconstrained warning polygon to be no more than the maximum vertices limit, thereby generating a constrained warning polygon. The reduction in the number of vertices may be accomplished in several ways. In a first way, the system may focus its analysis on the number of vertices (e.g., a direct analysis of the number of vertices). In a second way, the system may focus its analysis on the distances between vertices (such as a distance threshold) in reducing the number of vertices (e.g., an indirect analysis of the number of vertices).

In a first example of the first way, the system may generate the constrained warning polygon by building the set of vertices for the constrained warning polygon upward. As one example, the system may initially select two vertices from the set of vertices for the unconstrained warning polygon as the first 2 vertices in the set of vertices for the constrained warning polygon. The initially-selected two vertices may comprise the vertices that are the farthest (e.g., distance-wise) from one another. Thereafter, the system may select a third vertex for the set of vertices for the constrained warning polygon. The third vertex may be selected based on the initially-selected two vertices, such as the vertex farthest (e.g., distance-wise) from the initially-selected two vertices and may lie sequentially between first and second vertex. After adding the third vertex, the system may remove its correspondingly associated segment from the set of maintained segments (in this instance, remove the segment between the first vertex and the second vertex).

Adding the third vertex results in the addition of two segments, the segment from the first vertex to the third vertex and the segment from the second vertex to the third vertex. Responsive to determining that the number of vertices (in this instance, three vertices) is not equal to the maximum vertices limit, the system may select the vertex that is the farthest from one of the segments (e.g., the vertex that is farthest from the segment between the first and second vertices) to be the fourth vertex in the set of vertices for the constrained warning polygon.

After defining the initial polygon have three vertices and segments, the system may select each subsequent segment, and respective vertex, from the set of maintained segments. For each segment in the set of maintained segments, the system defines a farthest point from the segment. In one example, the system may calculate the distance from each segment in the set to all points and identify the farthest distance for each segment. The system compares each of these farthest points and selects the one with the largest distance from among the segments in the set of maintained segments. The system selects the segment that is associated with the largest distance as the next segment to be removed to increase the number of segments and vertices of the polygon. The selected segment is removed from the set of maintained segments. Two new segments connecting the new point (e.g., fourth vertex) are added to the set of maintained segments. This process may be repeated for any number of vertices.

In one example, of the polygon with three vertices, the system may select the farthest point from respective segments, with the farthest vertex selected (the fourth vertex) lying sequentially between first vertex and third vertex. Thereafter, responsive to determining that the number of vertices is not equal to the maximum vertices limit, the system may select the vertex that is the farthest from another of the segments (e.g., the vertex that is farthest from the segment between the second and third vertices) to be the fifth vertex in the set of vertices for the constrained warning polygon. For example, the system may select the farthest point from the segment connecting second vertex and third vertex, with the selected farthest vertex (the fifth vertex) lying sequentially between second vertex and third vertex. In this manner, the system may maintain each segment along with its corresponding single farthest point (which lies sequentially between starting and end vertex of the segment) and the distance of the point from the segment.

Further, with the addition of vertices, the system may add segments. For example, with the addition of the fourth vertex, the system may add two new segments and remove an existing segment from the set of maintained segments. For example, the fourth vertex, in between the first vertex and third vertex, results in the following two additional segments: a segment from the first vertex to the fourth vertex and a segment from the fourth vertex to the third vertex. Further, the system removes the segment from the first vertex to the third vertex. In this way, with each vertex added, two segments may be added and one segment may be removed. In one implementation, the system may maintain the set of segments in the form of heap data structure. The system may then continue this process, selecting the farthest vertex from the virtually-drawn segments until the maximum vertices limit is reached or until the maximum distance value from the set of maintained segments is less than a predetermined non-zero value.

In a second example of the first way (in which the analysis focuses on the number of vertices), the system may generate the constrained warning polygon by reducing the set of vertices in the constrained warning polygon downward. For example, the system may begin by removing a single vertex from the set of vertices for the unconstrained warning polygon. The vertex removed may be the closest vertex from one or more of the remaining vertices in the set of vertices for the unconstrained warning polygon. This process may be continued until the maximum vertices limit in the constrained warning polygon is reached.

In one example of the second way of constraining the warning polygon (e.g., focusing on the distance between vertices as an indirect way of reducing the number of vertices), a modified Douglas-Peucker algorithm may be used. The Douglas-Peucker algorithm (also known as the Ramer-Douglas-Peucker algorithm) comprises an iterative end-point fit algorithm, in which a curve composed of line segments is replaced with a similar curve comprising points. The algorithm may input a threshold value and iteratively reduce the number of vertices that are greater than threshold value. In this way, the system may select the threshold value, which in turn may result in the number of vertices being reduced based on the threshold value. However, the resultant reduced number of vertices, after performing the algorithm, may be less than or greater than the maximum vertices limit. In this regard, after the algorithm is performed, the system may compare the resultant number of vertices being reduced based on the threshold value with the maximum vertices limit. If the resultant number of vertices is greater than the threshold value with the maximum vertices limit (meaning that the number of vertices is to be reduced further), the system may select a larger threshold value (e.g., a threshold value that is larger than the threshold value selected in the first iteration of the algorithm). In this way, the resultant number of vertices may be reduced further.

Thus, there are a plurality of ways in which the vertices for the warning polygon may be constrained. In one implementation, the constraint of the vertices is performed in real-time. In this regard, computational complexity may be considered when determining which way to constrain the polygon.

For example, the average case for computational complexity may comprise: $\Theta(N*\log(M))$, wherein $\Theta$ is the asymptotic tight bound, N=number of vertices before approximation, and M=Number of required vertices after approximation. Specifically, the methodology for the first example of the first way discussed above may comprise two main operations:

createMiddlePoint( )

Inside createMiddlePoint( ) comparison is an operation while computing the middle of each trail. Further, each trail includes O(trail_size) comparisons to compute its middle. The following table illustrates the number of comparisons performed based on the number of vertices.

| M vertices obtained due to splitting | Number of comparisons used inside createMiddlePoint( ) |
|---|---|
| 1 = M | N |
| 1 + 2~4 = M | 2N |
| 1 + 2 + 4~8 = M | 3N |
| 1 + 2 + 4 + 8~16 = M | 4N |

Thus, the combined complexity contributed by all createMiddlePoint( ) comprises $N*\log(M)$.

Further, combined complexity contributed by all PriorityQueue< > operations: $M*\log(M)$.

Hence, $T(N,M) \in \Theta(N*\log(M)+M*\log(M)) \in \Theta(N*\log(M))$. Thus, in the average case, $T(N,M) \in \Theta(N*\log(M))$.

Figure 3B:
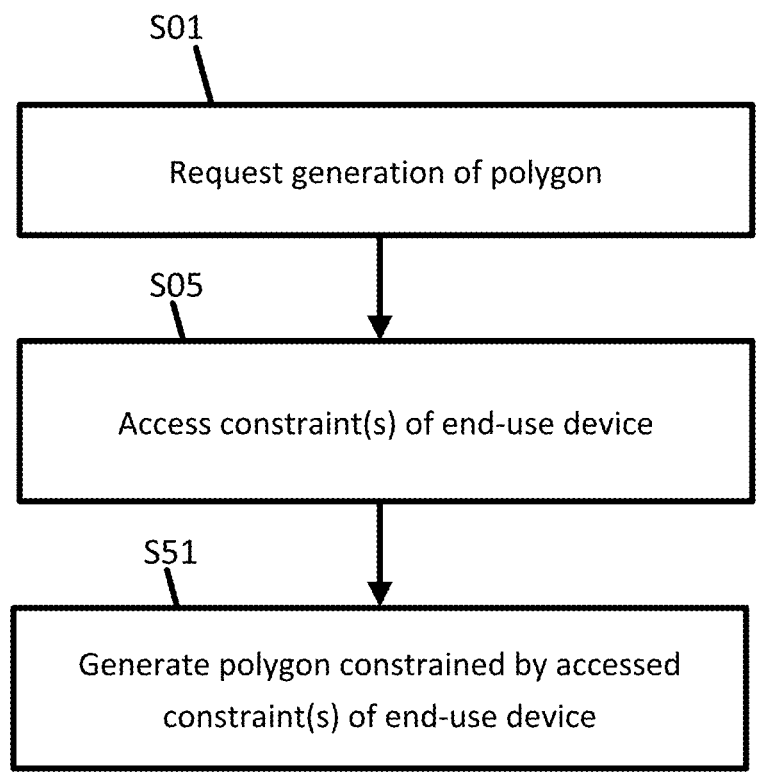
FIG. 3B illustrates a second example flowchart of generating a polygon constrained by end-use device constraints.
Figure 3C:
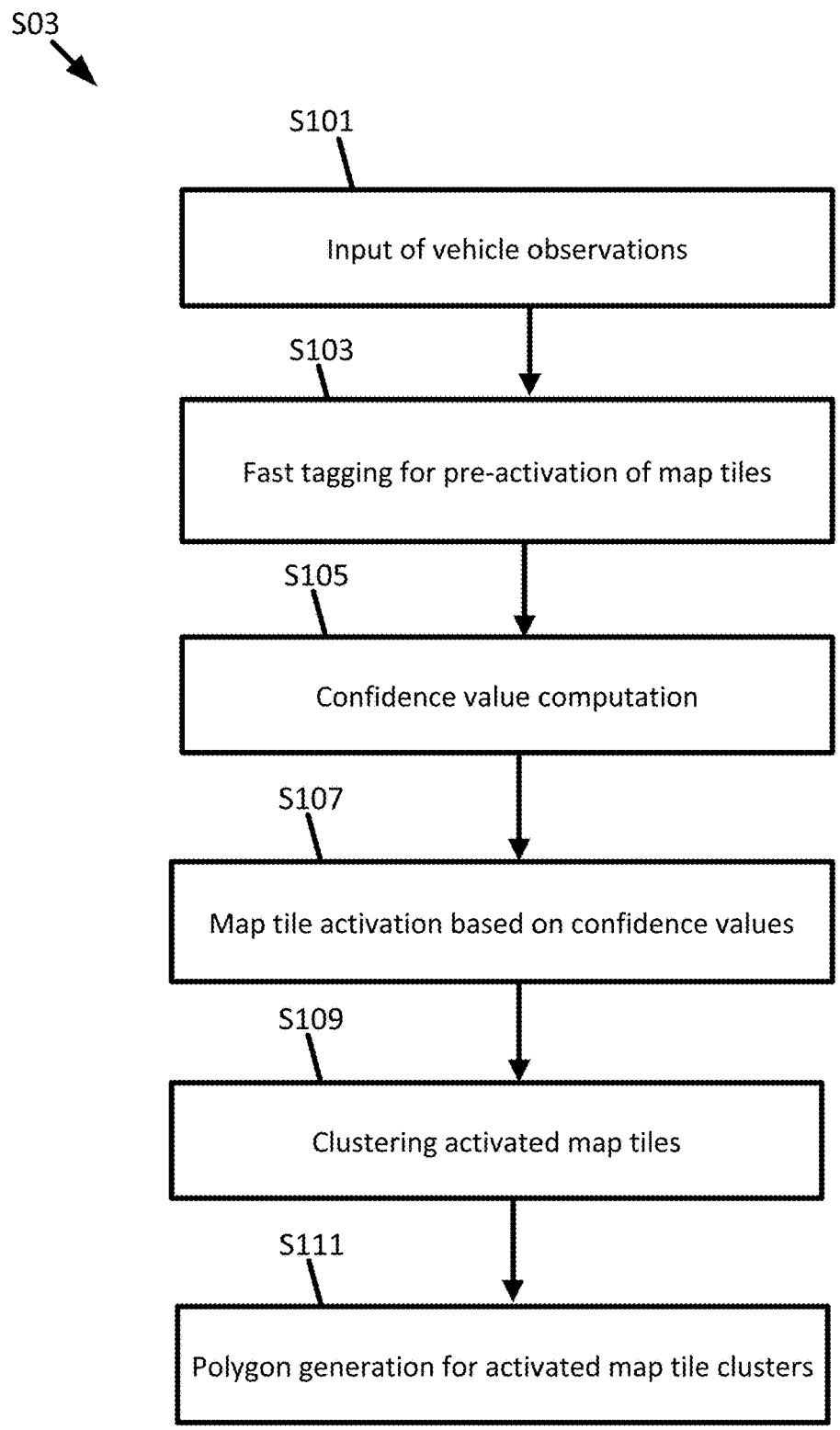
FIG. 3C illustrates an example flowchart for generating the polygon.

FIG. 3B illustrates a second example flowchart of generating a polygon constrained by end-use device constraints. The acts or stages in FIG. 3B may be performed in any order. Certain acts or stages may be performed in parallel. Certain acts or stages are performed automatically in response to one or more prior acts or stages. Additional, different, or fewer acts or stages may be included. At act S01, a device requests generation of the polygon. At act S05, the constraint(s) of the end-use device are accessed. At act S51, a polygon is generated that, in the initial build of the polygon, is constrained based on the constraints. For example, in building the set of vertices for the polygon, the number of vertices is limited to be no more than the maximum vertices limit.

FIG. 3C illustrates an example flowchart for the polygon builder 121 of at S03 in FIG. 2A to generate warning polygons for weather events in a geographic region. The acts or stages in FIG. 3C may be performed in any order. Certain acts or stages may be performed in parallel. Certain acts or stages are performed automatically in response to one or more prior acts or stages. Additional, different, or fewer acts or stages may be included.

At act S101, the polygon builder 121 may receive the input of vehicle observations from probes 101a-n. The vehicle observations may be measurement data as the data collected by the sensors or conditioned data after some processing of the data collected by the sensors. The processing of the sensor data may include removal of outliers or noise, filtering of the data, or time sampling the data.

The probe data may include multiple types of data packaged together in messages. The probe data may include sensor data related to a weather event. The weather events may include rain, fog, precipitation, snow conditions, ice conditions, or others. In some examples, the sensor data may be collected by vehicle sensors that detect the ambient environment of the vehicle 124. In other examples, the sensor data may be collected by vehicle sensors that detect the operation of one or more systems or features of the vehicle 124.

For example, a rain sensor may be mounted on the exterior of vehicle 124 to detect rain or other precipitation. The rain sensor may be an optical sensor or a capacitive sensor. The rain sensor may detect drops or particles of precipitation that fall on a plate or a chamber. In another example, data collected by a temperature sensor may be used in combination with the data collected by the rain sensor to infer the type of precipitation (e.g., rain, sleet, snow, ice, etc.). The rain sensor may measure the quantity of the precipitation, the rate of the precipitation, or the intensity of the precipitation.

The weather condition may be inferred from the use of a device, system, or operation of the vehicle 124. Precipitation may be inferred from a windshield wiper sensor or wiper blade sensor that detects when the windshield wipers are running, or at a specific speed or interval. Snow conditions may be inferred from operation of an all-wheel drive or four-wheel drive mode. Ice conditions may be inferred from traction control or anti-lock brakes activation. Fog conditions may be inferred from the operation of fog lights such as rear fog lights. In one example, the headlights, or lights in general, may infer the existence of a reduced visibility event. When the headlights are used, the time of day may limit the associated. For example, the system may detect a limited visibility event when it is daylight (e.g., the current time is between an expect dawn and dusk for the detected geographic location) and the headlights are turned on by the driver of the vehicle, or automatically.

The probe data may also include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The input 30 is in communication with the probes 101a-n. The input 30 may include a transceiver or a communication circuit configured to receive communication signals from the probes 101a-n. The communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 4:
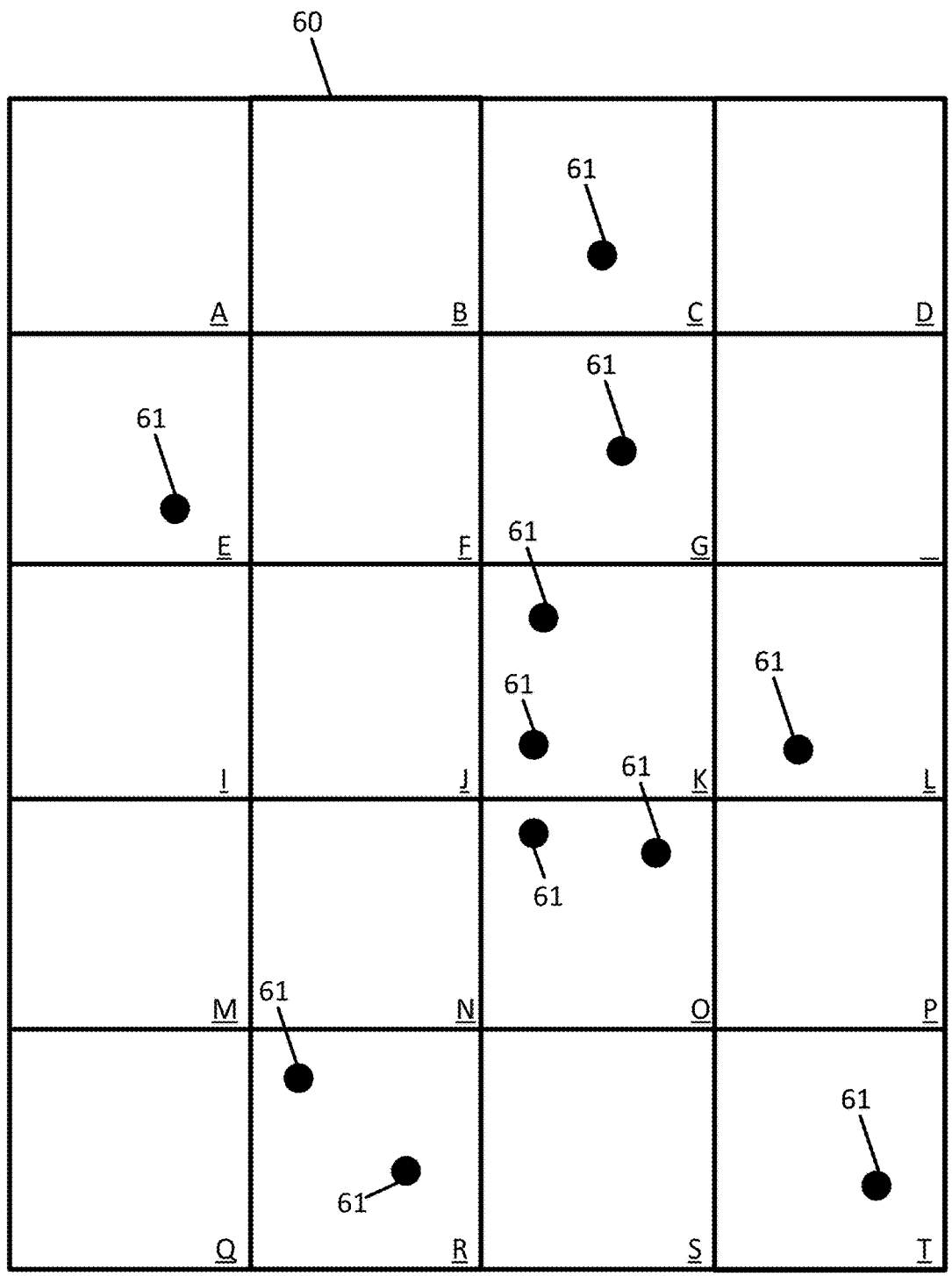
FIG. 4 illustrates an example input stage for the polygon builder of FIG. 2A.

FIG. 4 illustrates an example input stage for the weather polygon controller of FIG. 2C, which corresponds to act S101. FIG. 4 illustrates a set of map tiles 60 for a geographic region. The set of map tiles 60 includes individual map tiles A through T. The map tiles are partitions of map data that may be bounded by geographic distances.

The geographic region may correspond to a political boundary such as a state, a city, a village, a township, or a neighborhood. The larger region may be divided into map tiles have a predetermined size (e.g., 10 square miles) or a predetermined number of degrees or portion of the earth's surface. The map tiles may be defined according to a hierarchical system of different layers such that map tiles in different layers have different sizes. The embodiments herein may be applied to any of the layers or different layers.

Example dimensions of the map tiles A through T may be 100 meters, 1 kilometer, 5 kilometers, 10 kilometers, 14 kilometers, or 20 kilometers.

The polygon builder 121 through input 30 may receive data for the set of map tiles including a map tile identifier. The map tile identifier may be an alphanumeric code unique to each map tile. The map tile identifier may be indicative of a geographic order of the map tiles such that adjacent map tiles have map tile identifiers that differ by a predetermined amount or increment. The data for the set of map tiles may include geographic coordinates for the borders, edges, or centers of the set of map tiles.

Figure 5:
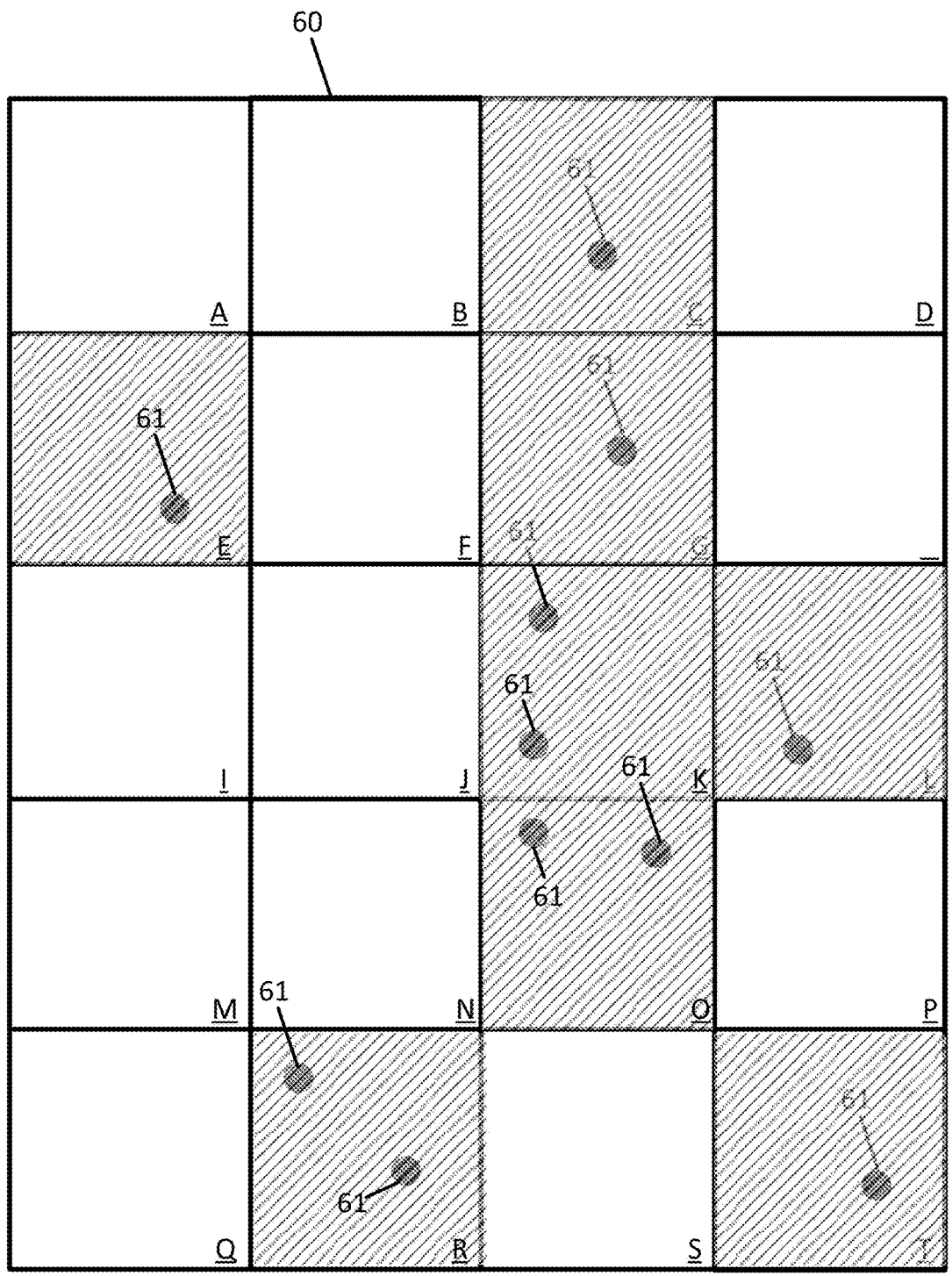
FIG. 5 illustrates an example pre-activation stage for the polygon builder of FIG. 2A.

FIG. 5 illustrates an example pre-activation stage for the polygon builder 121 of FIG. 2C. At act S103, the polygon builder 121 through map tile activator 32 may perform fast tagging for pre-activation of map tiles. The map tile activator 32 may identify multiple map tiles for activation. The map tile activator 32 may include one or more processors or integrated controllers configured to analyze the sensor data with respect to map tiles. The probe data includes sensor data associated with location data indicative of the location at which the sensor data was collected. In FIG. 5 the subset of the map tiles 60 that includes at least one data measurement are identified or pre-activated. FIG. 5 illustrates a shading for the subset of map tiles, including map tiles A, C, E, G, K, L, O, R, and T.

The pre-activation enables the polygon builder 121 to avoid processing all of the map tiles 60. Instead, only the pre-activated tiles are fully processed, which are the tiles that can be affected by the incoming vehicle observations of the weather event. The pre-activated tiles may be the tiles with a measurement observed within the borders of the tile. The pre-activated tiles may be tiles within a predetermined distance of a measurement. The predetermined distance may be 100 meters, 1 kilometer, 5 kilometers, 10 kilometers, 14 kilometers, or 20 kilometers.

The predetermined distance may be selectable by a user. The user may select the predetermined distance to minimize the existence of false positives while maximizing the detection of all weather events. The predetermined distance may be selectable over time. For example, as vehicles 124 or mobile devices 122 report false positives, the predetermined distance may be decreased to reduce the occurrence of false positives. Likewise, as vehicles 124 or mobile devices 122 report weather events that were not detected, the predetermined distance may be increased to activate more map tiles in response to the measured observations.

The predetermined distance may be selected based on other map data. For example, the predetermined distance may be selected according to a terrain feature such as the type of terrain. Mountains may have rapidly changing weather, which is better detected by a smaller predetermined distance for pre-activating the map tiles. Plains or flatter terrain may be associated with a larger predetermined distance for pre-activating the map tiles. As another example, the predetermined distance may be selected based on the proximity of a weather impacting body of water. The weather impacting body of water may be a body of water that impacts the weather such as an ocean, sea, or great lake. When the measured observation is within a distance range of a weather impacting body of water, a small predetermined distance is used for pre-activating the map tiles, and when the measured observation is farther than the distance range of a weather impacting body of water, a large predetermined distance is used for pre-activating the map tiles.

A measurement may be within the predetermined distance of multiple map tiles. That is, a single measurement may cause multiple map tiles to be pre-activated. Only the specific tiles that are pre-activated from being near observations are processed further, as described in the subsequent stages. Map tiles that are not pre-activated tiles are not further processed. The pre-activation stage speeds up processing since vehicle observations are sparse and only some of the map tiles are fully processed. The map tile activator 32 may determine which map tiles include measurements or are within the predetermined distance to the measurements. The map tile activator 32 is configured to identify at least one location from the measurement and determine whether each of the map tiles is within a predetermined distance to the at least one location.

The index of activated map tiles 34 specifies whether or not a map tile is pre-activated or tagged for subsequent analysis. The index of activated map tiles 34 may include a data structure that lists the map tiles of a geographic region. The map tiles may be listed by the map tile identifier (e.g., sorted numerically) or by location (e.g., sorted geographically).

The data structure of the index of activated map tiles 34 may include a flag for indicating the map tile identifiers associated with a pre-activated map tile. The map tile activator 32 may insert the flag for some map tiles and remove or omit the flag for some map tiles. The flag may be either on or off, high or low, 1 or 0, with one value indicating that the map tile identifier is pre-activated, and the other indicating that the map tile identifier is not pre-activated. The map tile activator 32 is configured to define an index including the at least one map tile in response to identification that the at least one map tile is within the predetermined distance to the at least one location.

In some embodiments, the pre-activation stage at act S103 may further include an analysis for the removal of false positives. The polygon builder 121 may identify patterns in the sensor data, which may be correlated with other sensor data, that are indicative of false positives. In one example, a transient feature of the sensor data may indicate a false positive. For example, if the data indicates that a condition has occurred less than a predetermined amount of time, it may be considered a false positive. For example, when the rain sensor indicates rain for only a few seconds, it may be caused by something other than weather. In another example, when a windshield wiper sensor (or on switch for the windshield wiper) detects the windshield wiper is on for less than the predetermined amount of time, a user may have mistakenly switched on the wiper signal in an attempt to activate a turn signal. In other example, the sensor data may be correlated with other data. For example, reports of heavy rain from the sensor day may be determined to be a false positive when the vehicle is traveling at a high rate of speed (e.g., greater than 100 KPH).

Figure 6:
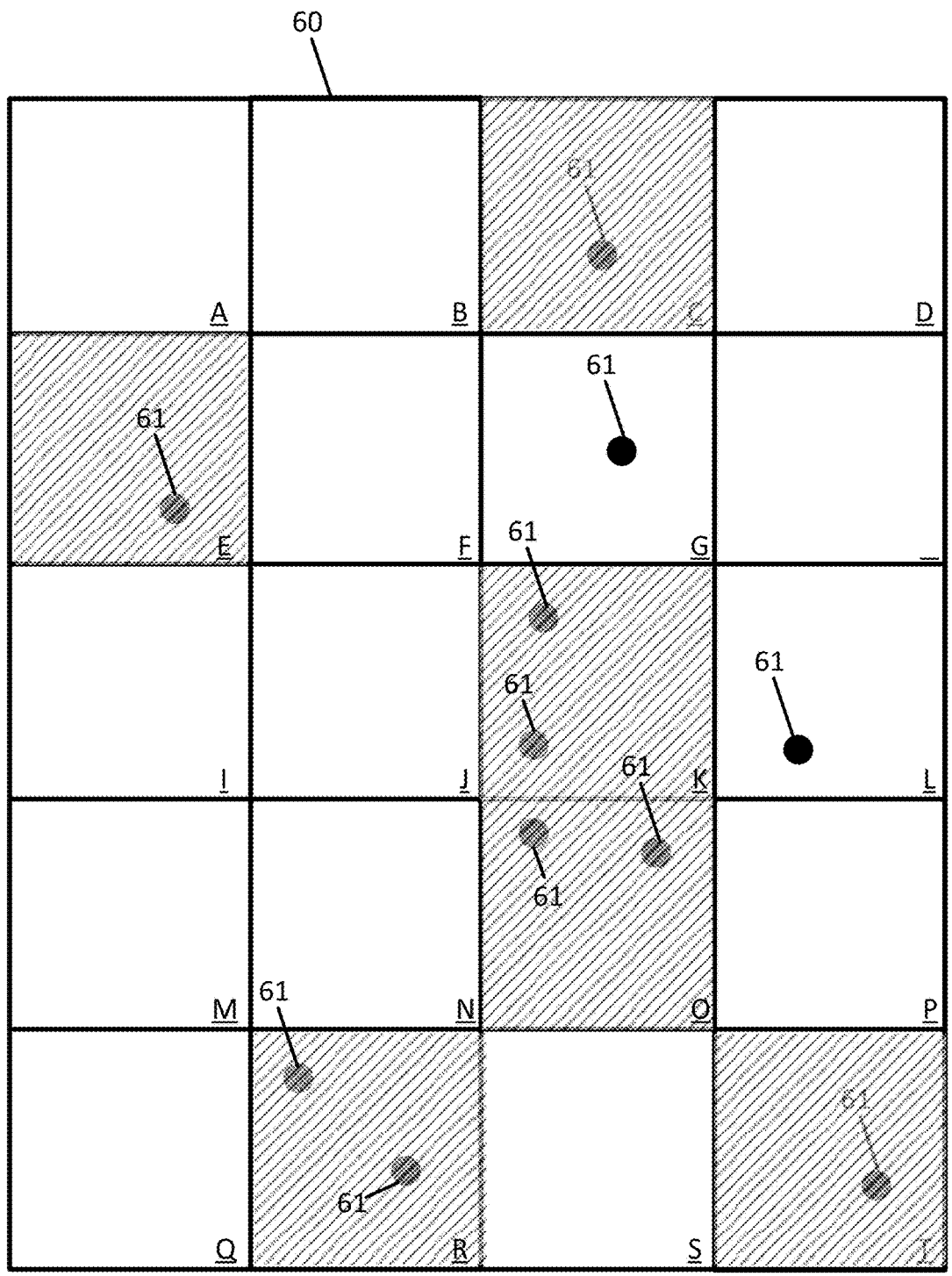
FIG. 6 illustrates an example confidence value stage for the polygon builder of FIG. 2A.

FIG. 6 illustrates an example confidence value stage for the polygon builder 121 of FIG. 2C. At act S105, the polygon builder 121 through the map tile activator 32 may calculate confidence levels for the map tiles included in the index of activated map tiles 34. In FIG. 6, map tiles G and L and are no longer illustrated and have been de-activated as not meeting the confidence requirements.

The map tile activator 32 may access the index of activated map tiles 34 for each of the map tiles in the index to compute respective confidence levels for the map tiles. The confidence level may be calculated from the value of the sensor data, the location for the sensor data, a timestamp for the sensor data, and a reference point in the respective map tile.

The reference point may be a specific point in each of the map tiles. Example reference points may include a centroid of the map tile or a directional portion of the map tile. The centroid may be the average location of all the points in the map tile. The centroid may be at the intersection of lines drawn from the edges or vertices of the map tile. The directional portion of the map tile may be the northwest corner, the northeast corner, the southwest corner, or the southeast corner. The direction portion of the map tile may be the north center side, the south center side, or another side of the map tile.

The map tile activator 32 computes the confidence value for each of the map tiles by adjusting the confidence values such that the confidence varies inversely with distance from the observing probe to the reference point in the map tile. In addition or in the alternative, the map tile activator 32 computes the confidence value for each of the map tiles by adjusting the confidence values such that the confidence varies inversely with the time that has elapsed since the measurement was taken. Thus, the confidence value may be a spatio-temporal quantity that varies with distance and time. Because the construction of the polygon described herein may be based on the confidence value, the polygon may also be a spatial-temporal quantity that varies in distance and time. Equation 1 demonstrates that the confidence value for a map tile varies inversely with distance and time.

$$\text{confidence value} = (1-\exp(-a/x))*(1-\exp(-b/t)) \quad \text{Eq. 1}$$

The value for x is distance between the location data of the sensor data and the reference point of the map tile. The value for t is the time elapsed between the timestamp of the sensor data and a current time. The exponential function, exp(z), is the value of e to the power of z, and e is the base of the natural logarithm, 2.718. The current time may be a system clock for the map tile activator 32 or the polygon builder 121. The current time may be a projected time for when the results of the polygon builder 121 would reach a display or a mobile device. The value for a is a distance decay factor. An example distance decay factor is 1.85. The value for b is a time decay factor. An example time decay factor is 7.5.

The map tile activator 32 or the polygon builder 121 is configured to compare the calculated confidence level to a threshold confidence level. The threshold confidence level may have any value (e.g., 0.5, 1.0, 1.5). The threshold confidence level may be selected according to the constants of Equation 1. As shown in FIG. 6, map tiles G and L were removed from the set of tiles (highlighted tiles that were pre-activated) because the confidence level for map tiles G and L was determined by the polygon builder 121 to be less than the threshold. The map tile activator 32 or the polygon builder 121 is configured to remove the map tile identifiers for map tiles G and L from the index of activated map tiles 34 in response to the respective confidence levels being less than the threshold confidence level.

The threshold confidence level may vary according to map data for the map tile. The map data may include the types of roads in the map tile, the topography or terrain of the map tile, the proximity to particular road features, and/or the elevation of the map tile.

When the threshold confidence is selected according to the type of terrain, the threshold confidence level may be increased for certain features. Features that trigger an increased confidence threshold level may include mountains, bodies of water, or other features that impact the weather. The polygon builder 121 may analyze the map data associated with a particular map tile and increase the threshold confidence level when any of these features are detected.

The threshold confidence level to minimize the existence of false positives while maximizing the detection of all weather events. If the threshold confidence level is too low, map tiles may be tagged when there is no significant weather event but instead only a mist or very light rain. If the threshold confidence level is too high, significant weather events are not detected. The threshold confidence level may be selectable over time.

In one embodiment, as vehicles 124 or mobile devices 122 report false positives, the threshold confidence level may be decreased to reduce the occurrence of false positives. Likewise, as vehicles 124 or mobile devices 122 report weather events that were not detected, the threshold confidence level may be increased to activate more map tiles in response to the measured observations. The polygon builder 121 may analyze data from one or more sensors for a false positive and adjust the confidence level for the at least one map tile based on the false positive. The analysis of the sensor data may alternatively occur in the pre-activation stage at act S103.

Figure 7:
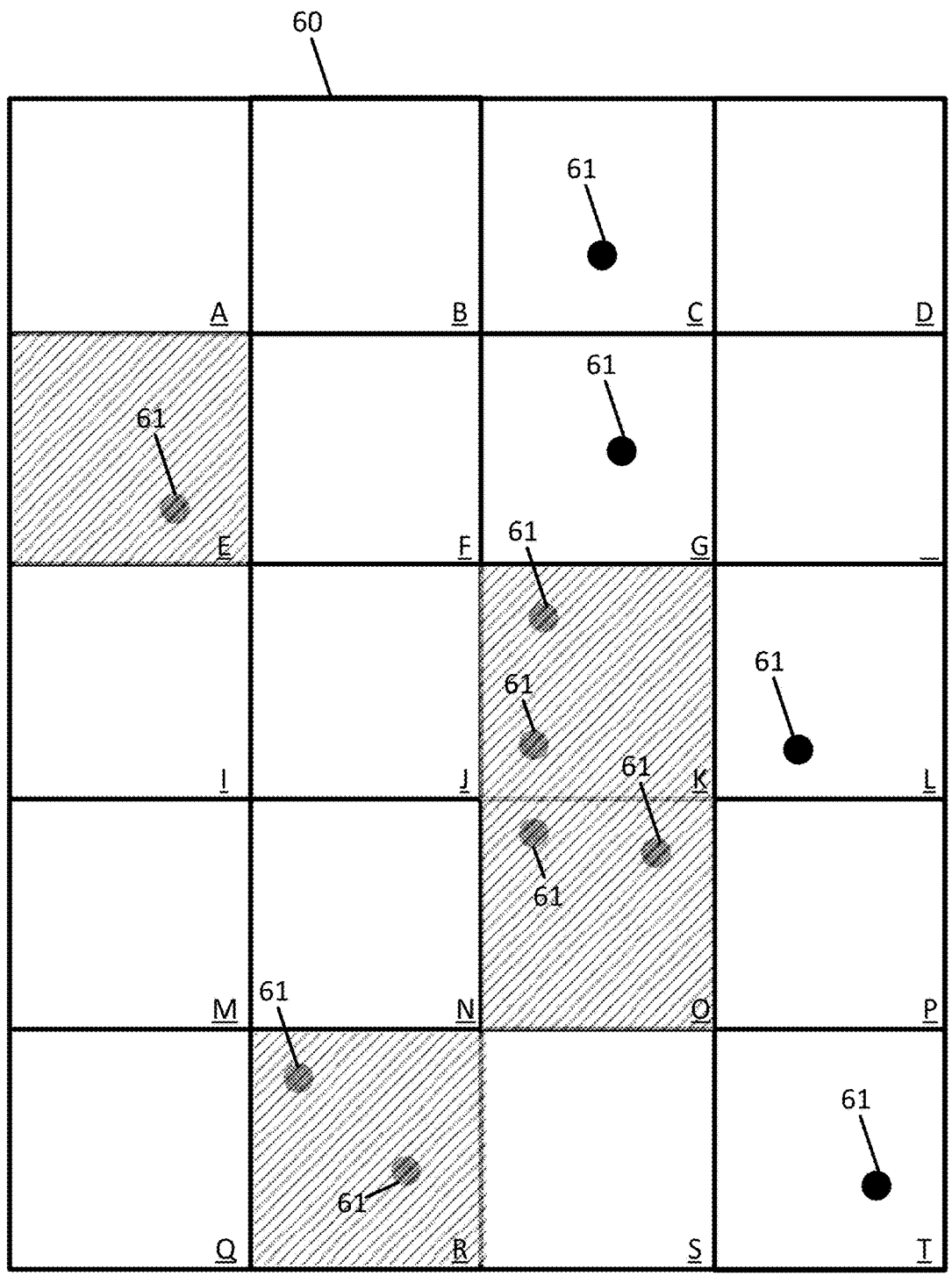
FIG. 7 illustrates an example clustering stage for the polygon builder of FIG. 2A.

At act S107, the polygon builder 121 may activate remaining map tiles that are clustered together. FIG. 7 illustrates an example clustering stage for the polygon builder 121 of FIG. 2C. During clustering, the activated tiles listed in (such as in a set of) the index of activated map tiles 34 are analyzed using a clustering technique. Example clustering techniques include a density model of clustering such as density-based spatial clustering of applications with noise (DB-SCAN), a centroid model of clustering such as K-means clustering, a connectivity or connected set model of clustering such as hierarchical clustering, graph-based clustering (e.g., JGraphT), or other examples.

In DB-SCAN clustering, given a set of measurements in the geographic region, the technique groups together measurements with locations that are near one another (i.e., high density regions) and designates as outliers those measurements that have fewer neighbors (i.e., low density regions). The DB-SCAN algorithm may be the faster for the data set. The outputted clusters at this stage are group of tiles that are both active and dense.

At act S109, the polygon builder 121 may perform clustering for the map tiles with confidence levels exceeding the threshold confidence level. Through the clustering technique one or more map tiles may be removed or omitted from the index of activated map tiles 34. In the example of FIG. 7, map tiles C and T are removed because map tiles C and T are not clustered with the remaining tiles. While not shown, map tiles C and T may be clustering with other clusters partially included in another geographic region or set of map tiles. In some examples, when all of the remaining map tiles are included in the cluster, no map tiles are removed or omitted in act S109.

Figure 8:
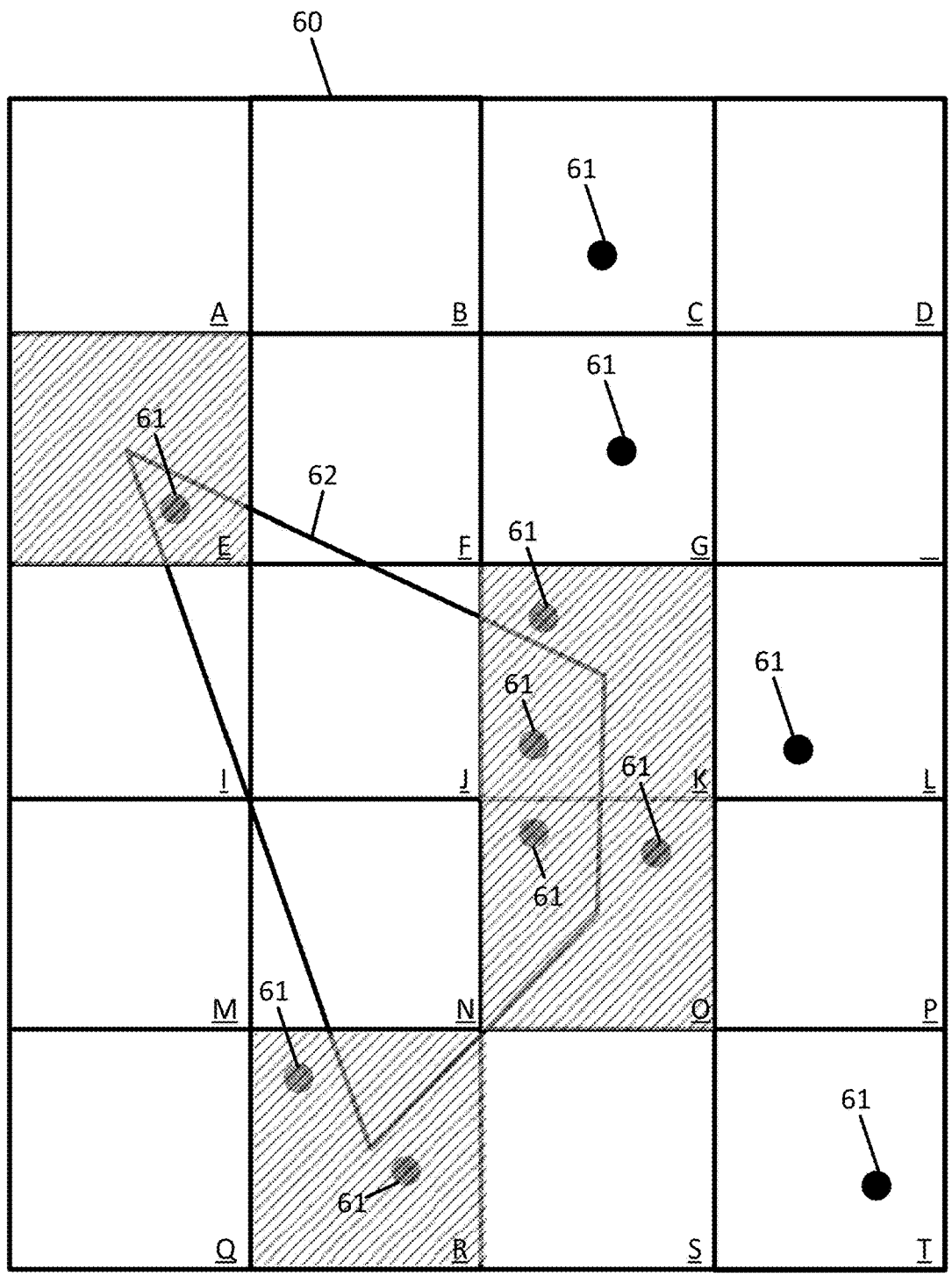
FIG. 8 illustrates an example polygon generation stage for the polygon builder of FIG. 2A.

FIG. 8 illustrates an example polygon generation stage for the polygon builder 121 of FIG. 2C. At act S111, the polygon builder 121 through the polygon generator 35 may calculate a polygon 62 based on the map tile clusters that are listed in (such as in a set of) the index of activated map tiles 34. The polygon builder 121 is configured to calculate a concave representation of the polygon 62 based on points from the map tile cluster, or calculate a convex representation of the polygon 62 based on points from the map tile cluster. The polygon generator 35 may include one or more processors or integrated controllers configured to generate the polygon 62.

The polygon may be a geometric shape that is connected by drawing edges between vertices associated with the remaining map tiles. The polygon may be drawing to connect a designated point from the map tiles. The designated point may be the centroid, the northwest corner, the northeast corner, the southwest corner, or the southeast corner. The designated of the map tile may be the northern most point, the southernmost point, the western most point, the eastern most point, or another point.

The polygon may be constructed from various techniques. Example techniques include the concave representation and the convex representation. For the concave representation, the polygon builder 121 may identify the two closest designated points from the remaining map tiles. A line is drawn between those designated points. The next closest designated point is identified and a line is drawn from the closest of the two original points. This process, identifying the next closest point and drawing a line to it from an already included point, is repeated until all points are connected. No restrictions are made with respect to the angles between the lines. For the convex representation, a restriction is added to the angles between the lines. Here, the polygon builder 121 only connects points such that the lines remain within 180 degrees to 360 degrees. In this way, the resulting polygon is always convex. Through either technique, the polygon builder 121 may minimize the number of edges or lines making up the polygon.

Experiments have shown that the convex representation of the polygon is substantially faster than the concave representation. Specifically, since these polygons may ultimately be displayed in the vehicle's navigation system which traditionally have low computing resource, it is beneficial for the polygons to have as few edges as possible. Thus, convex polygon generation algorithm may be selected.

FIGS. 10A, 11A, 12A, and 13A illustrate examples of polygons 73 drawn using the concave representation. FIGS. 10B, 11B, 12B, and 13B illustrate examples of polygons 74 drawn using the convex representation.

Figure 9:
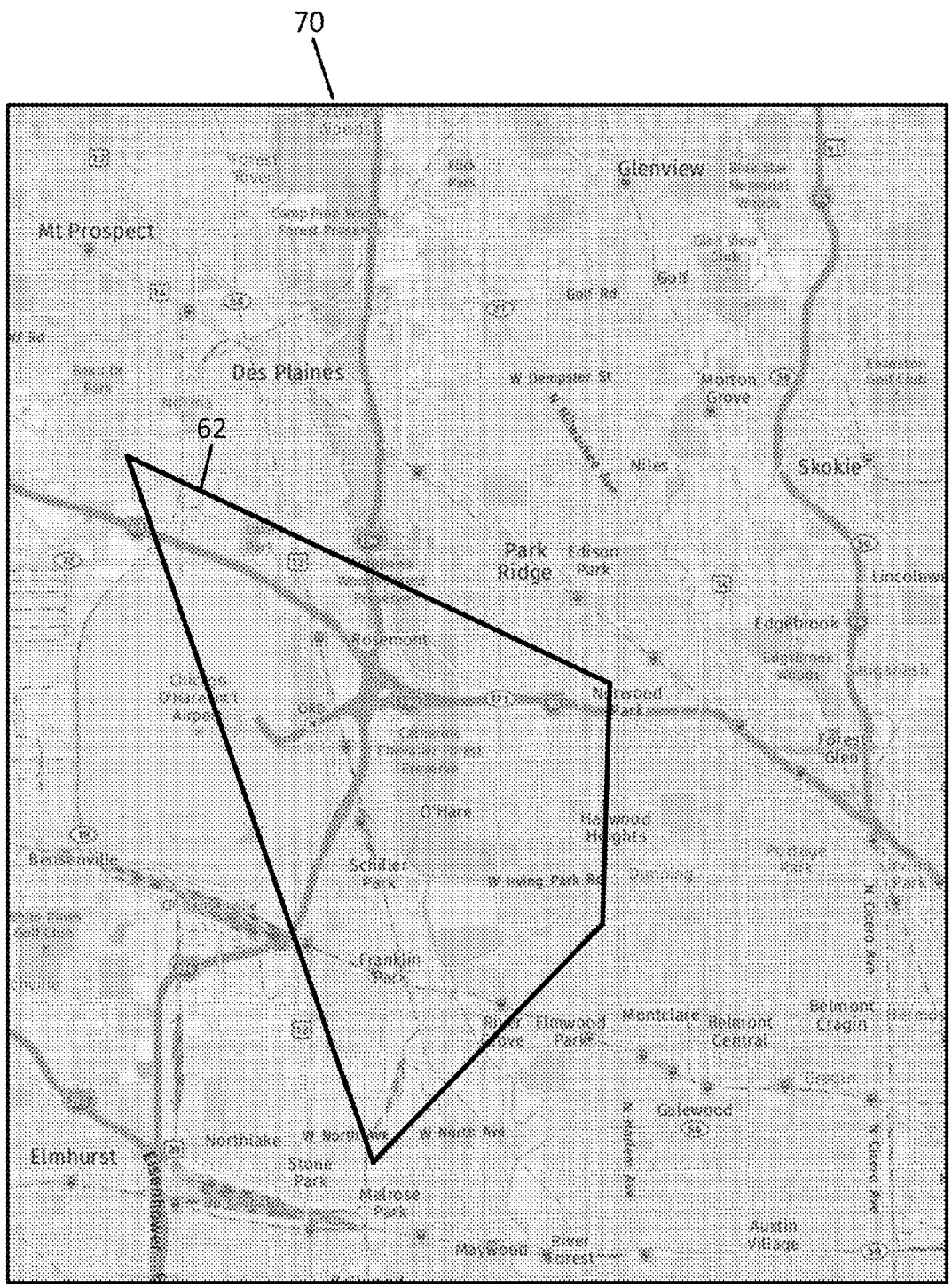
FIG. 9 illustrates an example output stage for the polygon builder of FIG. 2A.
Figure 10A:
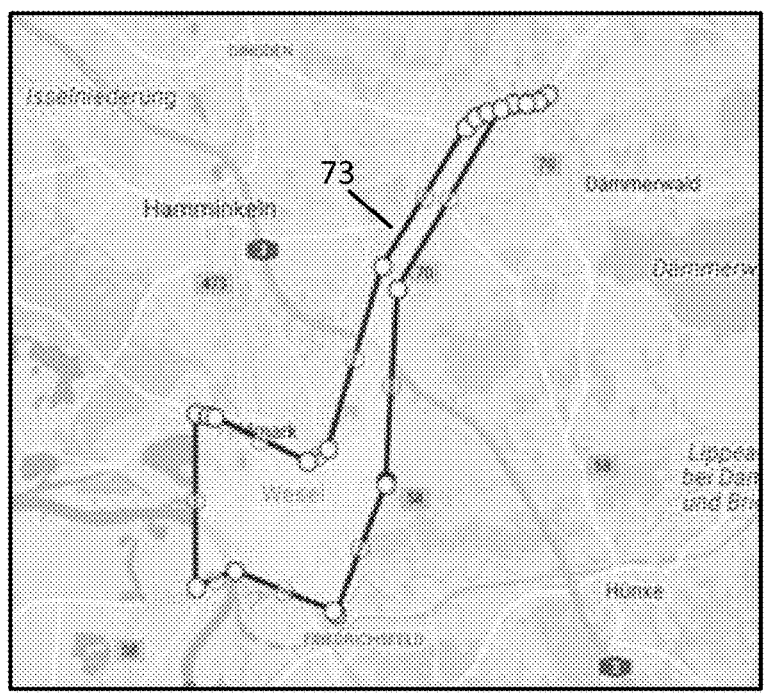
FIGS. 10A and 10B illustrate example polygon generation techniques.
Figure 10B:
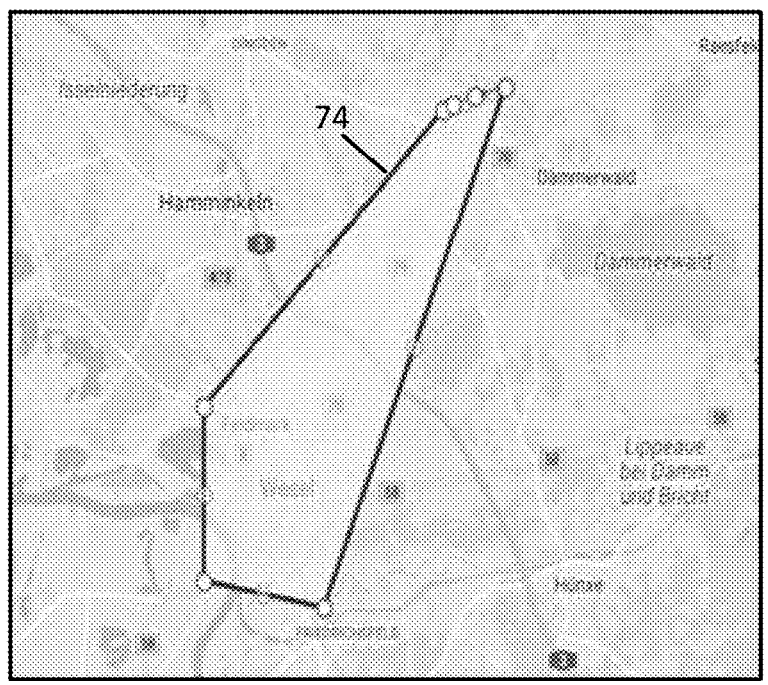
Figure 11A:
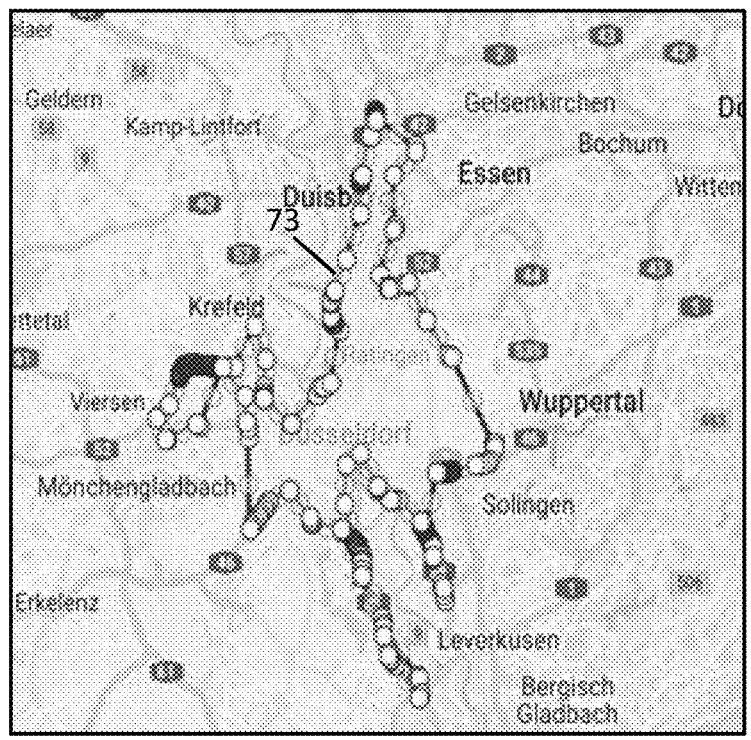
FIGS. 11A and 11B illustrate example polygon generation techniques.
Figure 11B:
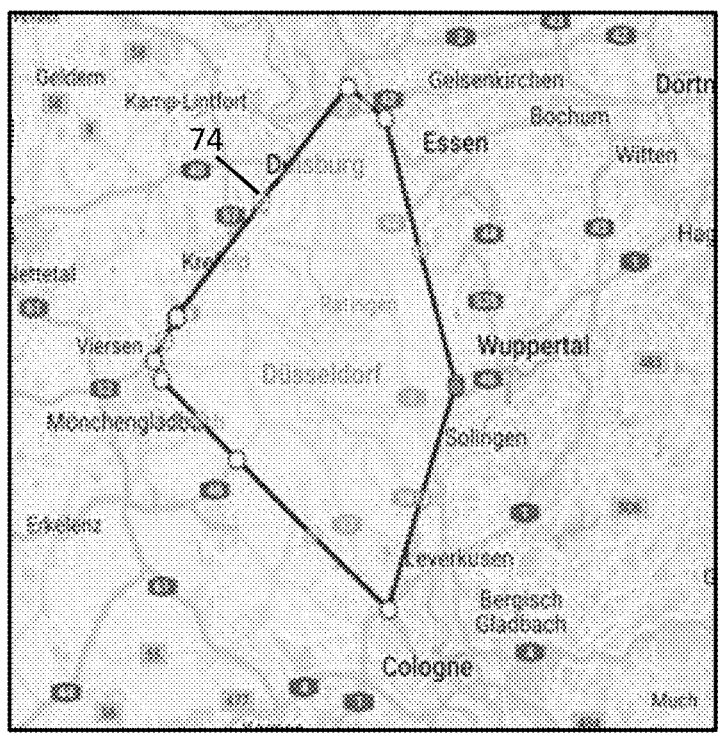
Figure 12A:
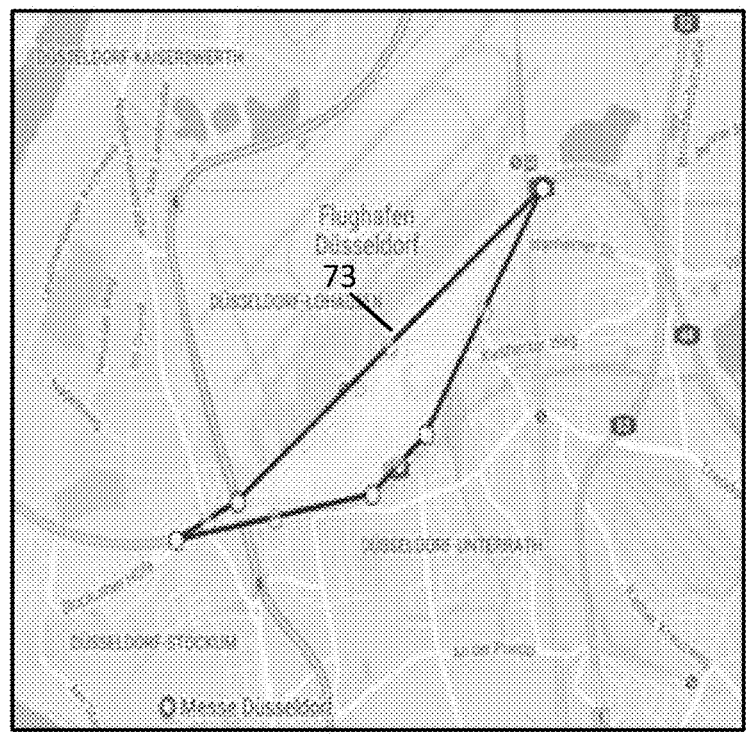
FIGS. 12A and 12B illustrate example polygon generation techniques.
Figure 12B:
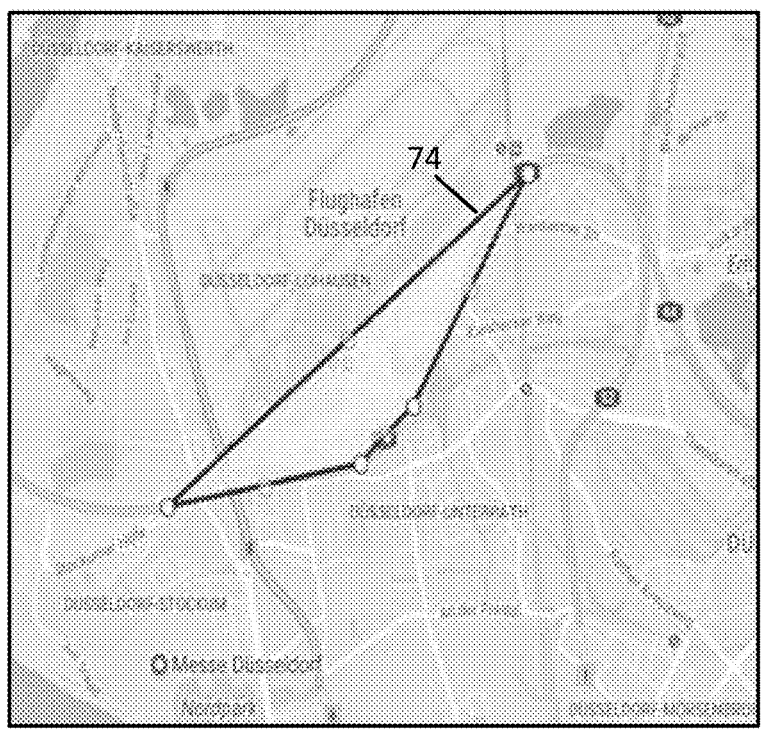
Figure 13A:
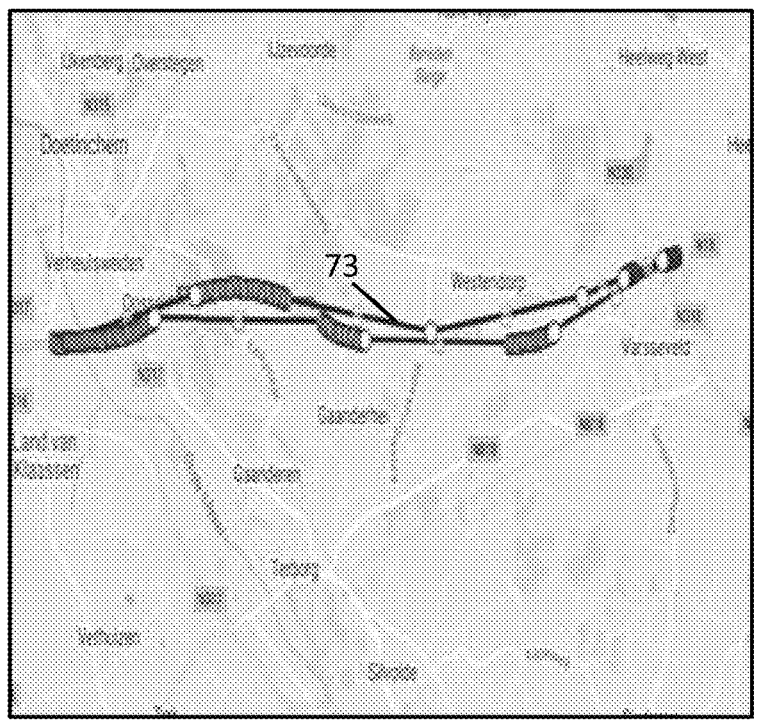
FIGS. 13A and 13B illustrate example polygon generation techniques.
Figure 13B:
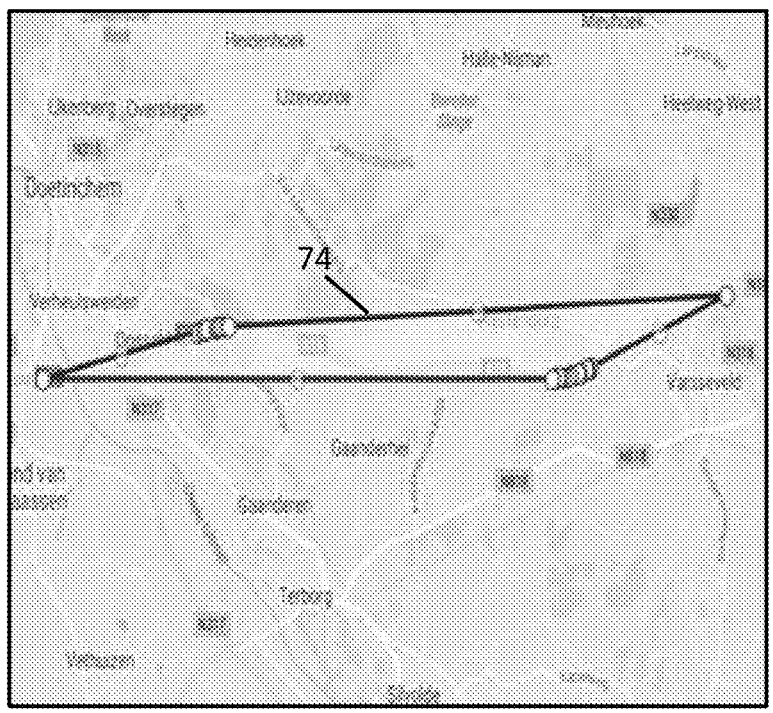

FIG. 9 illustrates an example output stage for the polygon builder 121 of FIG. 2C. The polygon 62 may be overlaid onto a map 70. At act S113, the polygon builder 121 may output the polygon 62 to a transmission channel that sends the polygon 62 to the external device 41. The polygon builder 121 is configured to generate the map 70 including the polygon and the geographic region. The map 70 corresponds to at least the map tiles remaining and may include all of the map tiles in the subset of map tiles from act S101.

The output of the polygon 62 may have various uses that provide technological improvements in several different fields. In one example, the external device 41 is a navigation system for one of the vehicles 124 that displays the map 70 and the polygon 62. The polygon 62 illustrates a weather event on the navigation system. A description of the weather event (e.g., rain, fog) may be display on the navigation system. A driver of the vehicle 124 may select a route in response to the weather event. The driver of the vehicle 124 may adjust a speed, change lanes, or exit a road in response to the weather event. Other warnings or messages may be provided to the driver.

The external device 41 may include a transmission channel for a cloud service. The cloud service may provide map data in response to requests made by mobile device 122 or vehicles 124. The requests may include location data. When the location data includes an area within range of polygon 62, the polygon builder 121 by way of the external device 41 provides data indicative of the polygon 62 to the requesting device.

Figure 14:
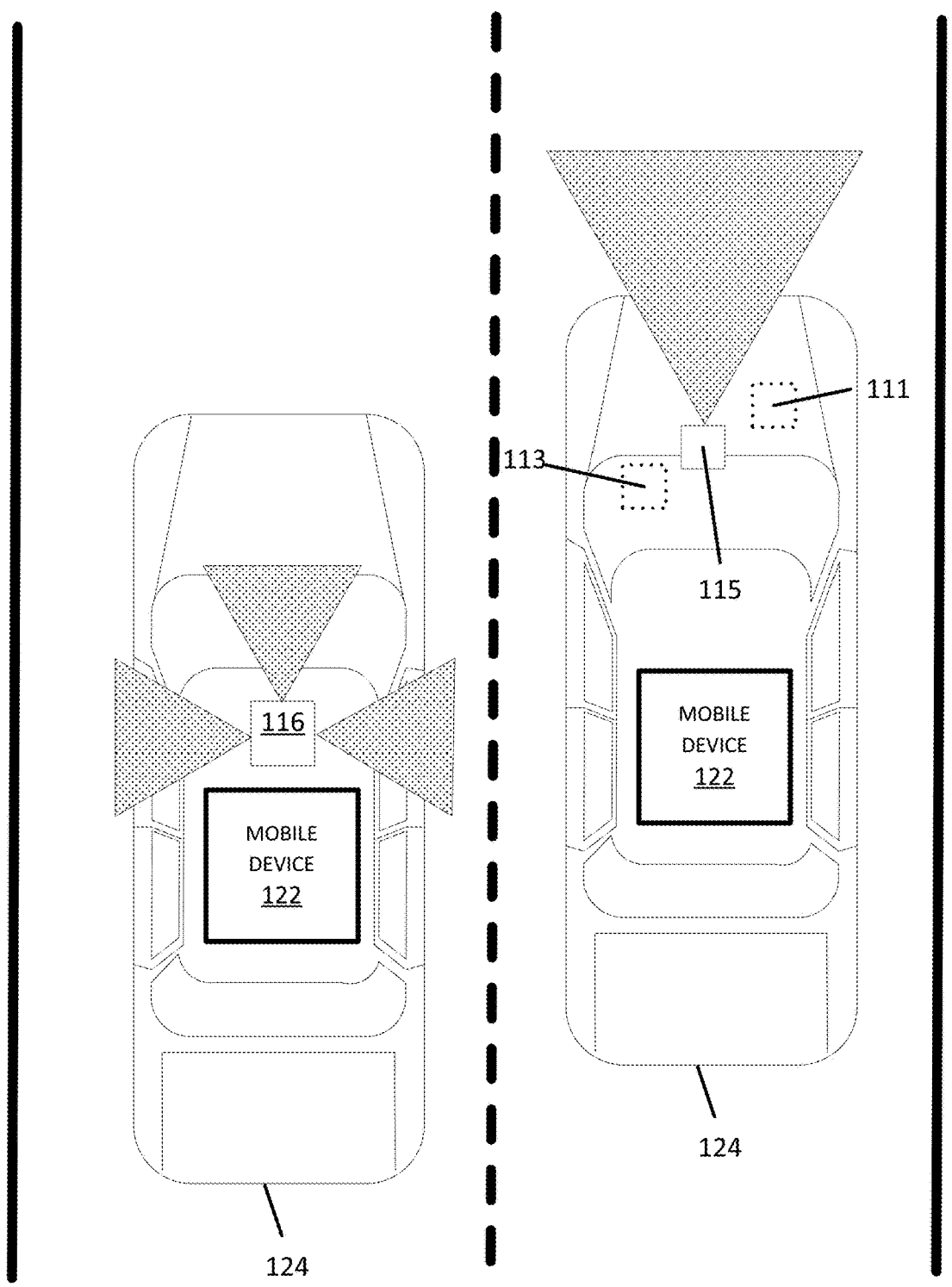
FIG. 14 illustrates an example array of sensors for a vehicle.

FIG. 14 illustrates an exemplary vehicle 124 of the systems of FIGS. 1A-9. The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124.

The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The sensor array configured to detect surroundings of the vehicle 124 may generate measurement data that describes a weather event. The probe data may include precipitation. Alternatively, the probe data may be analyzed to determine whether there is noise or distortion caused by the precipitation.

The weather events may include rain, fog, precipitation, snow conditions, ice conditions, or others. In some examples, the sensor data may be collected by vehicle sensors that detect the ambient environment of the vehicle 124. In other examples, the sensor data may be collected by vehicle sensors that detect the operation of one or more systems or features of the vehicle 124. The mobile device 122 or the polygon builder 121 may analyze the point cloud to determine if there is a weather event.

Additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels.

The vehicle sensor 113 may include multiple sensors. Examples for the vehicle sensors 113 may include the fog light sensor (e.g., separate front fog light sensor and rear fog light sensor), a headlight sensor, a windshield wiper sensor, a heater sensor, a defrost sensor (e.g., separate front defrost and rear defrost), seat warmer sensor, side mirror windshield wiper sensor, rear windshield wiper sensor, or another sensor. The light sensors may determine when the lights are turned on or off and/or the intensity of the light. The windshield wiper sensor may determine when the windshield wipers are turned on or off, the speed of the windshield wipers, and/or an interval duration for the windshield wipers. The vehicle sensor 113 may detect when the respective system (e.g., light or wiper) is turned on by the user or by an automated driving system.

The vehicle sensors 113 may include a rain sensor, a thermometer, an ice sensor, a snow sensor, or another sensor for the ambient environment of the vehicle 124. The vehicle sensors 113 may detect a mechanical system of the vehicle 124 such as a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and driving commands or navigation commands. The assisted driving vehicles may generate a warning or command in response to the weather polygon. The assisted driving vehicle may display, announce through a speaker, or otherwise provide a message to the user of the upcoming weather event based on the position of the vehicle 124 and/or the current driving or navigation commands. The message may include the type of the weather event, a distance to the weather event, and/or a suggested maneuver to increase safety with respect to the weather event.

In addition, ADAS vehicles include one or more partially automated systems in which the vehicle alerts the driver or assists the driver. The features are designed to avoid collisions automatically. Features may include adaptive cruise control, automate braking, or steering adjustments to keep the driver in the correct lane. The ADAS vehicle may modify settings for the adaptive cruise control, automate braking, or steering adjustments in response to the weather polygon. For example, the cruise control speed may be adjusted down, the braking distance threshold may be increased, and the deviation threshold for making steering adjustment may be decreased. ADAS vehicles may issue warnings for the driver based on the position of the vehicle or based on to geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes in response to the weather polygon. For example, transition from fully autonomous mode to partial autonomous mode with human intervention in response to the weather polygon. The autonomous vehicle may steer, brake, or accelerate the vehicle based on the position of the vehicle in order, and may respond to geographic data received from geographic database 123 and the server 125, driving commands or navigation commands, and/or in response to the weather polygon. The autonomous vehicle may generate a warning or other command in response to the weather polygon. The autonomous vehicle may modify driving commands or navigation commands based on the upcoming weather polygon. For example, the autonomous vehicle may reroute the vehicle in order to avoid, circumvent, or partially circumvent the weather polygon, or a predicted location of the weather polygon.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to geographic data received from geographic database 123 and the server 125 and driving commands or navigation commands. The HAD vehicle may control the steering or braking in response to the weather polygon. The HAD vehicle may reroute the vehicle in order to avoid, circumvent, or partially circumvent the weather polygon, or a predicted location of the weather polygon.

Figure 15A:
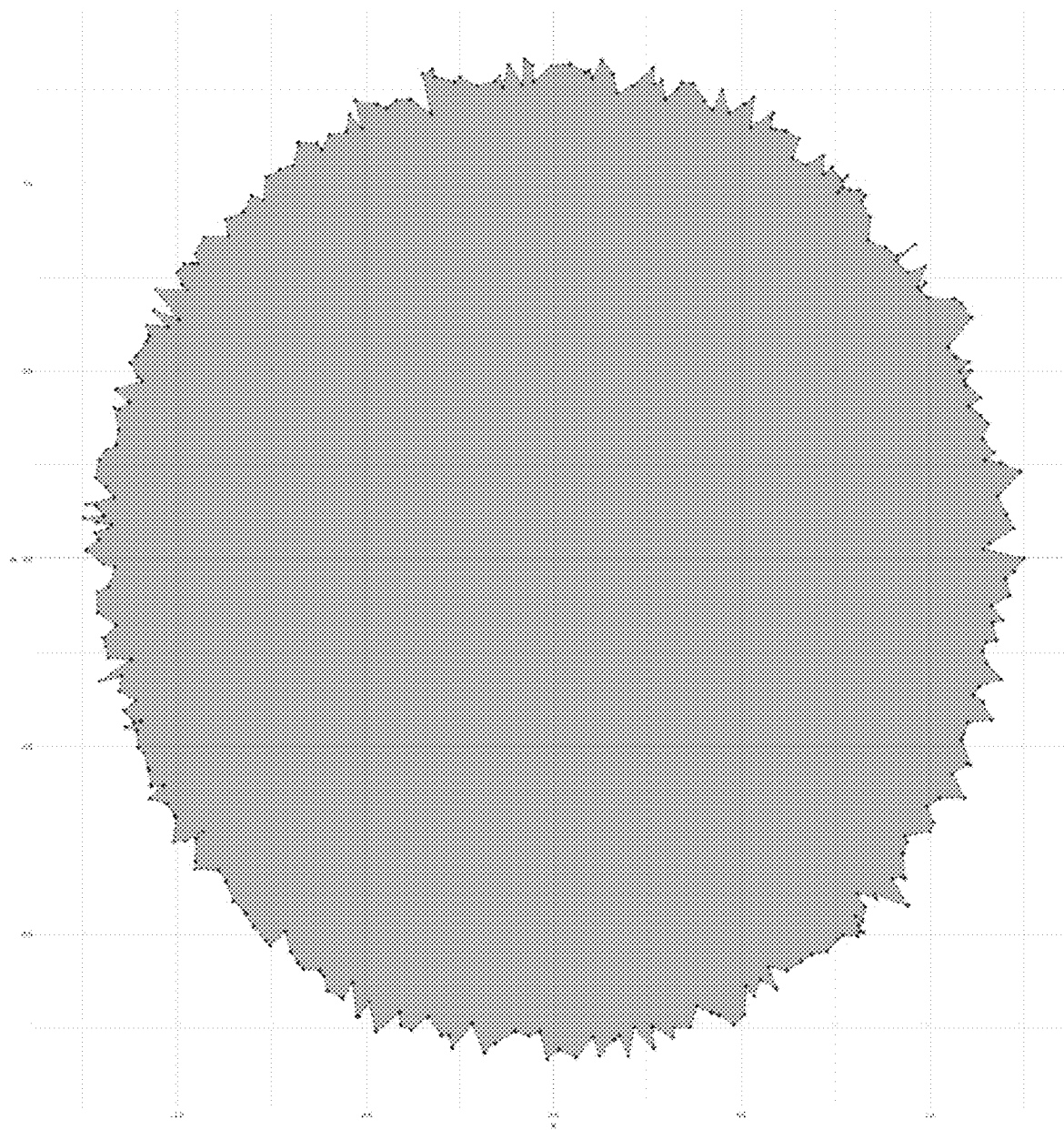
FIGS. 15A-C are a first set of examples of warning polygons, including an unconstrained polygon (FIG. 15A), a first constrained polygon (FIG. 15B) and a second constrained polygon (FIG. 15C).
Figure 15B:
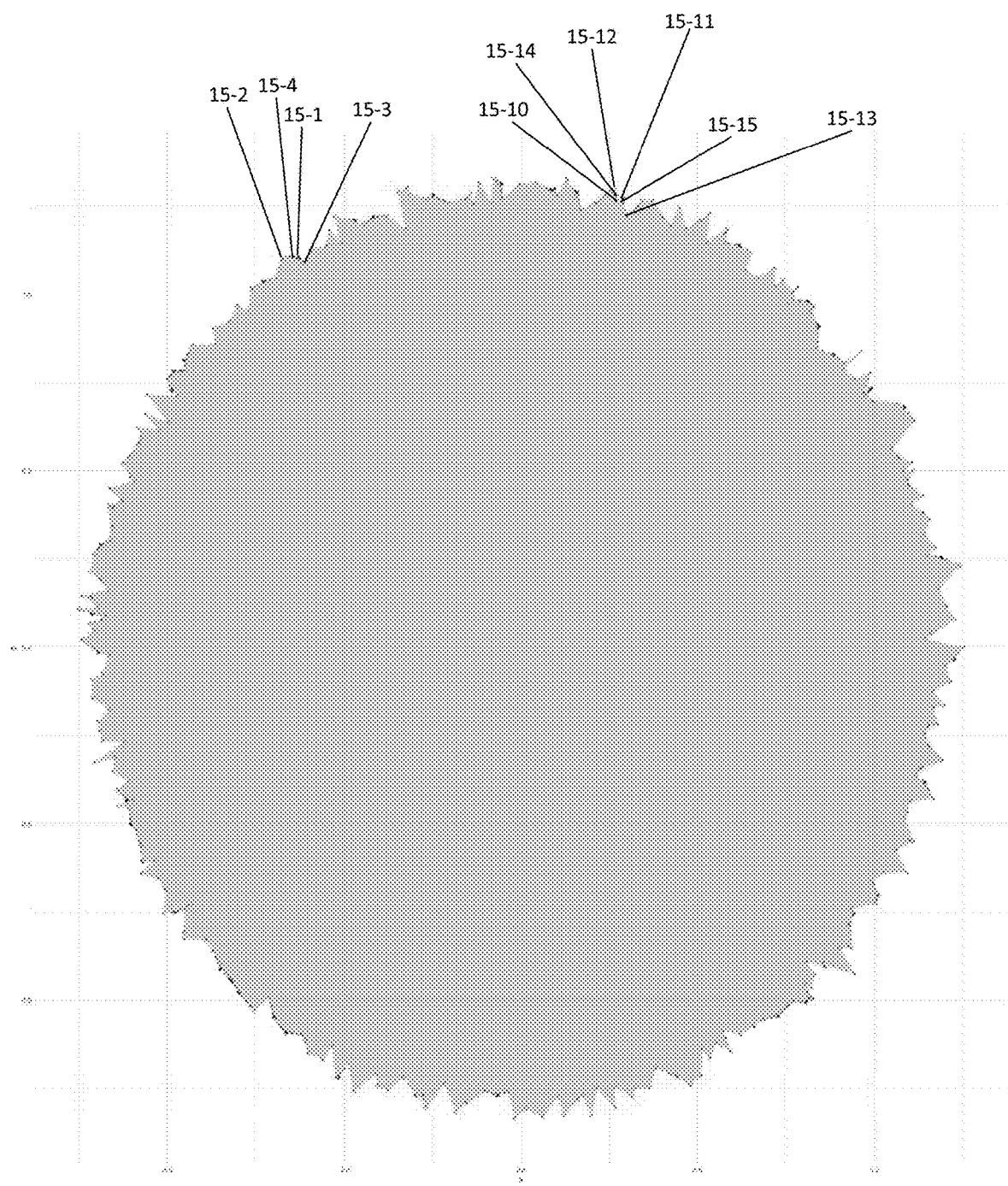
Figure 15C:
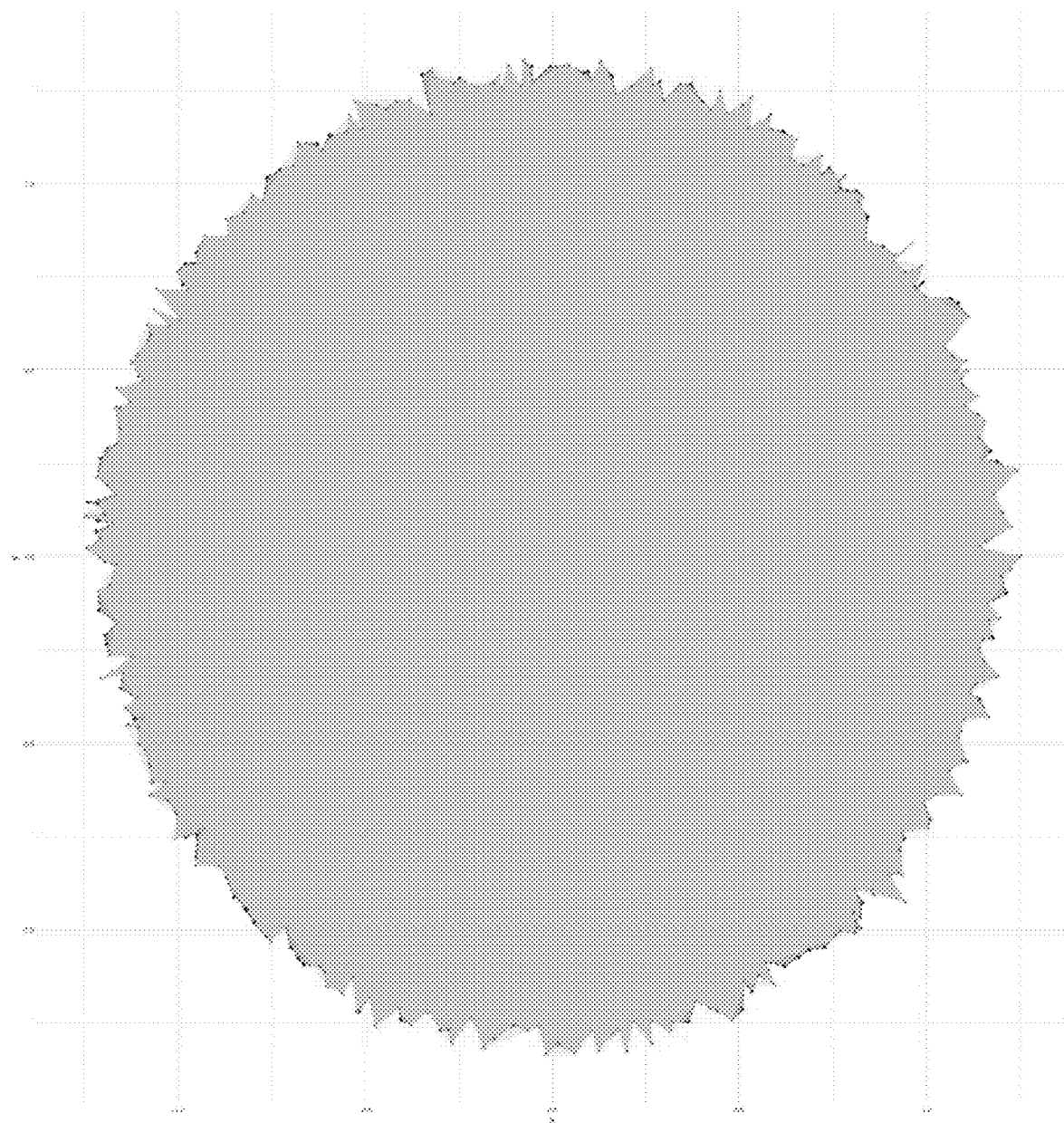

FIGS. 15A-C are a first set of examples of warning polygons, including an unconstrained polygon (FIG. 15A), a first constrained polygon (FIG. 15B) and a second constrained polygon (FIG. 15C). In particular, FIGS. 15A-C are a first set examples of polygons after applying iterative approximation with different number of vertices, with FIG. 15A comprising a polygon with 300 vertices, FIG. 15B comprising a polygon with 200 vertices, and FIG. 15C comprising a polygon with 150 vertices. For example, FIG. 15B shows that certain vertices are removes, resulting in areas either being included or excluded from the polygon depicted in FIG. 15A.

As one example, vertex 15-1 (included in the polygon depicted in FIG. 15A) is removed from the polygon depicted in FIG. 15B. The vertex is in between vertices 15-2 and 15-3, with a line drawn between vertices 15-2 and 15-3 resulting in an area 15-4 that was included in the polygon depicted in FIG. 15A being removed from the polygon depicted in FIG. 15B. As another example, vertices 15-10 and 15-11 (included in the polygon depicted in FIG. 15A) are removed from the polygon depicted in FIG. 15B. The vertex is in between vertices 15-12 and 15-33, with a line drawn between vertices 15-12 and 15-13 resulting in an area 15-14 that was excluded in the polygon depicted in FIG. 15A being included in the polygon depicted in FIG. 15B and resulting in an area 15-15 that was included in the polygon depicted in FIG. 15A being removed from the polygon depicted in FIG. 15B.

Figure 16A:
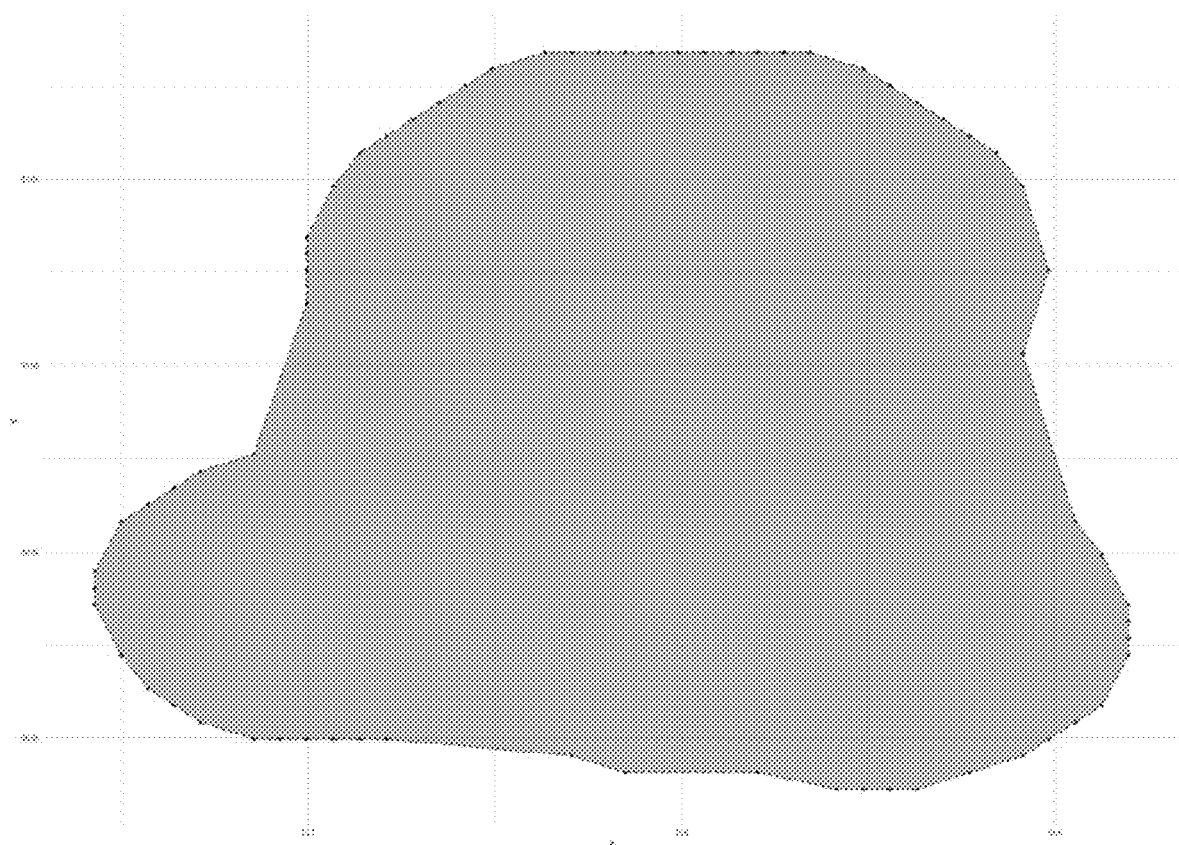
FIGS. 16A-C are a second set of examples of warning polygons, including an unconstrained polygon (FIG. 16A), a first constrained polygon (FIG. 16B) and a second constrained polygon (FIG. 16C).
Figure 16B:
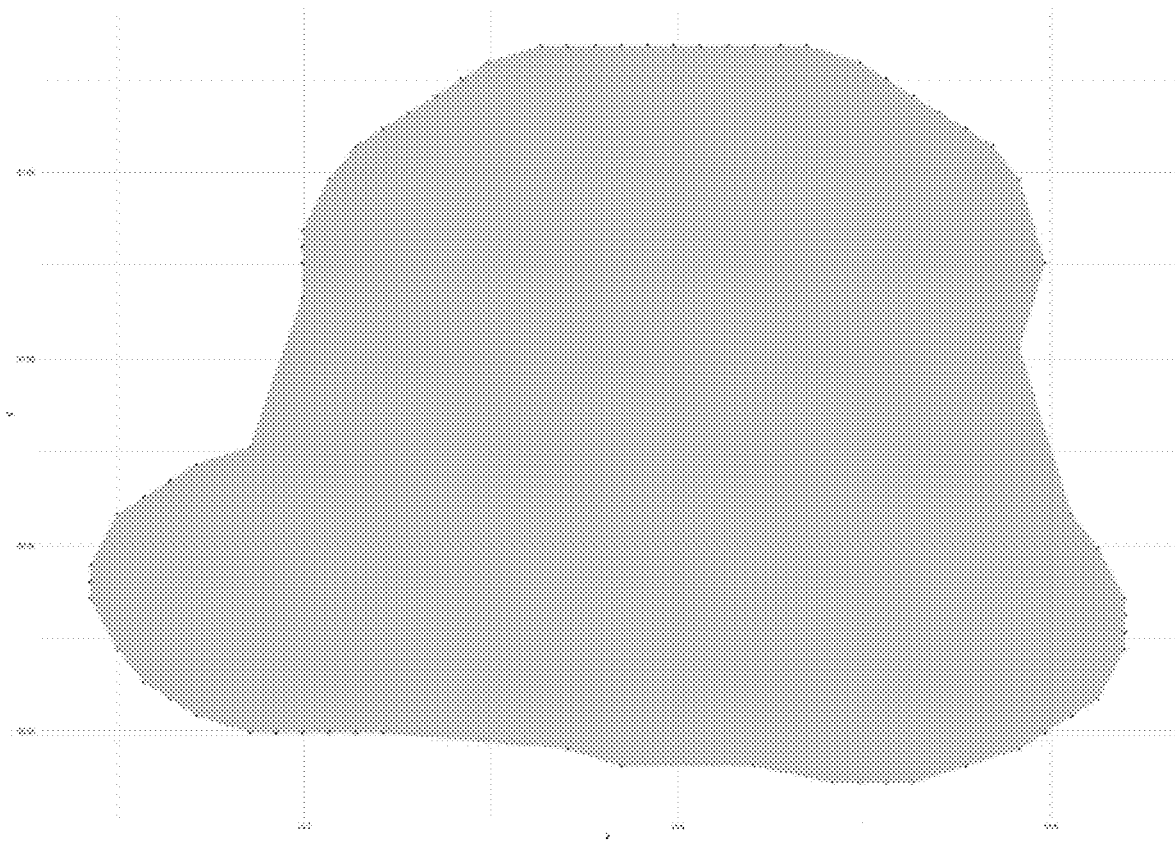
Figure 16C:
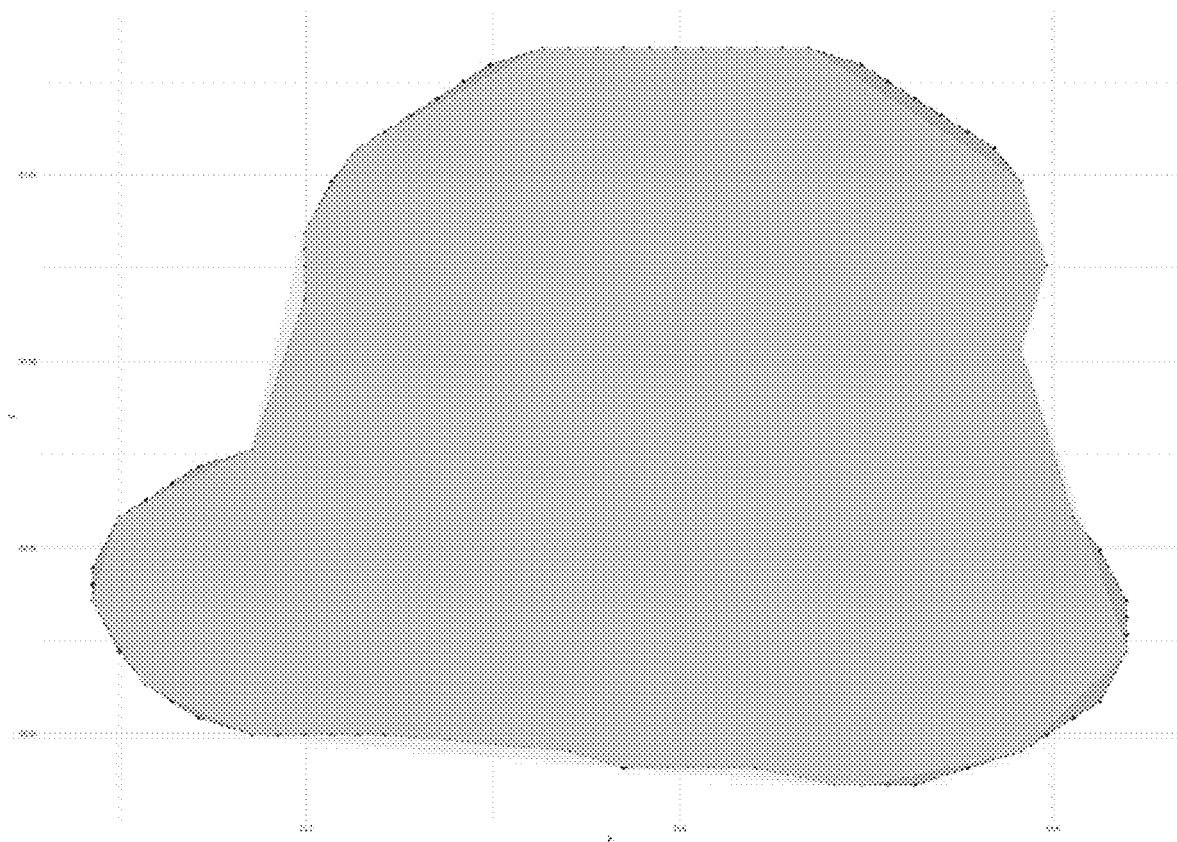

FIGS. 16A-C are a second set of examples of warning polygons, including an unconstrained polygon (FIG. 16A), a first constrained polygon (FIG. 16B) and a second constrained polygon (FIG. 16C). In particular, FIGS. 16A-C are a second set examples of polygons after applying iterative approximation with different number of vertices, with FIG. 16A comprising a polygon with 68 vertices, FIG. 16B comprising a polygon with 35 vertices, and FIG. 16C comprising a polygon with 16 vertices.

Figure 17A:
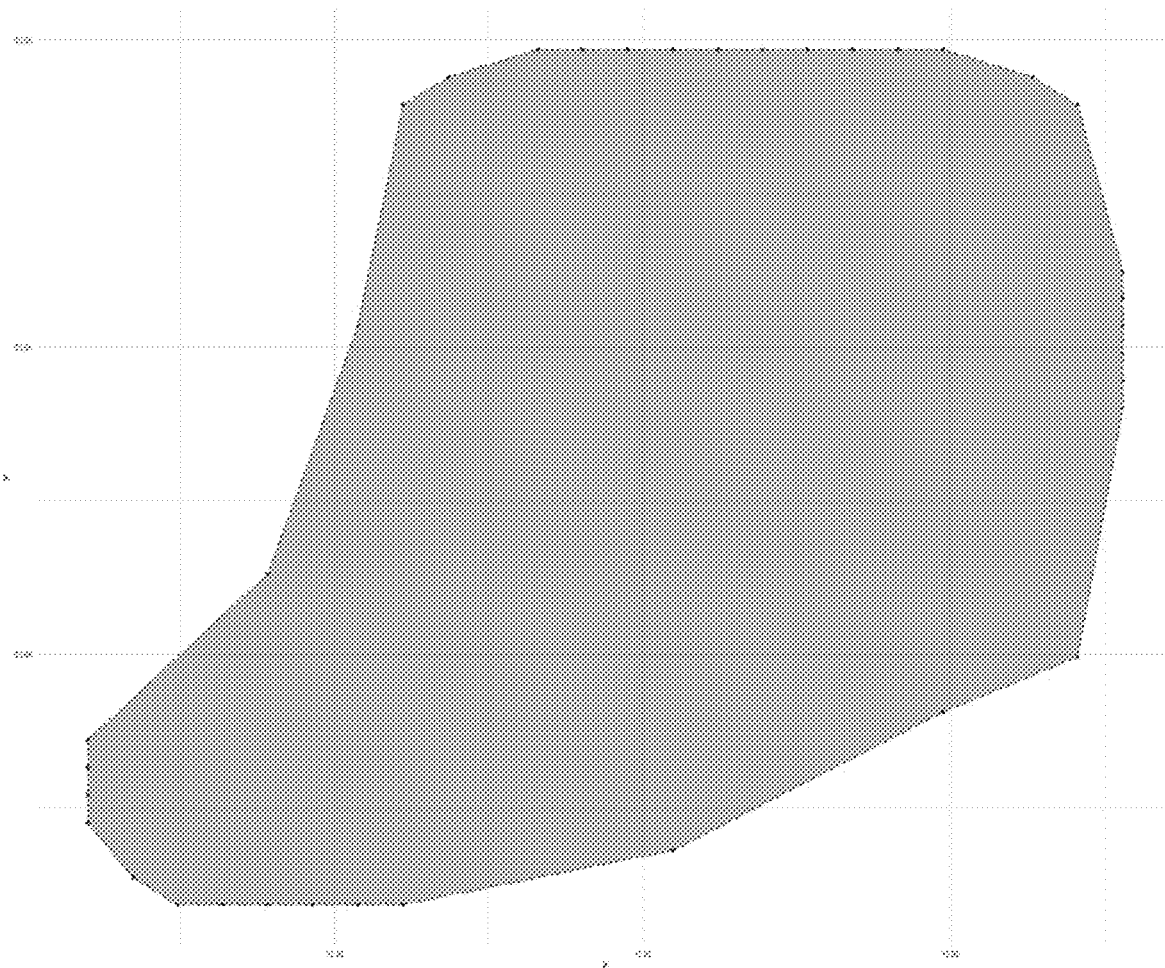
FIGS. 17A-C are a third set of examples of warning polygons, including an unconstrained polygon (FIG. 17A), a first constrained polygon (FIG. 17B) and a second constrained polygon (FIG. 17C).
Figure 17B:
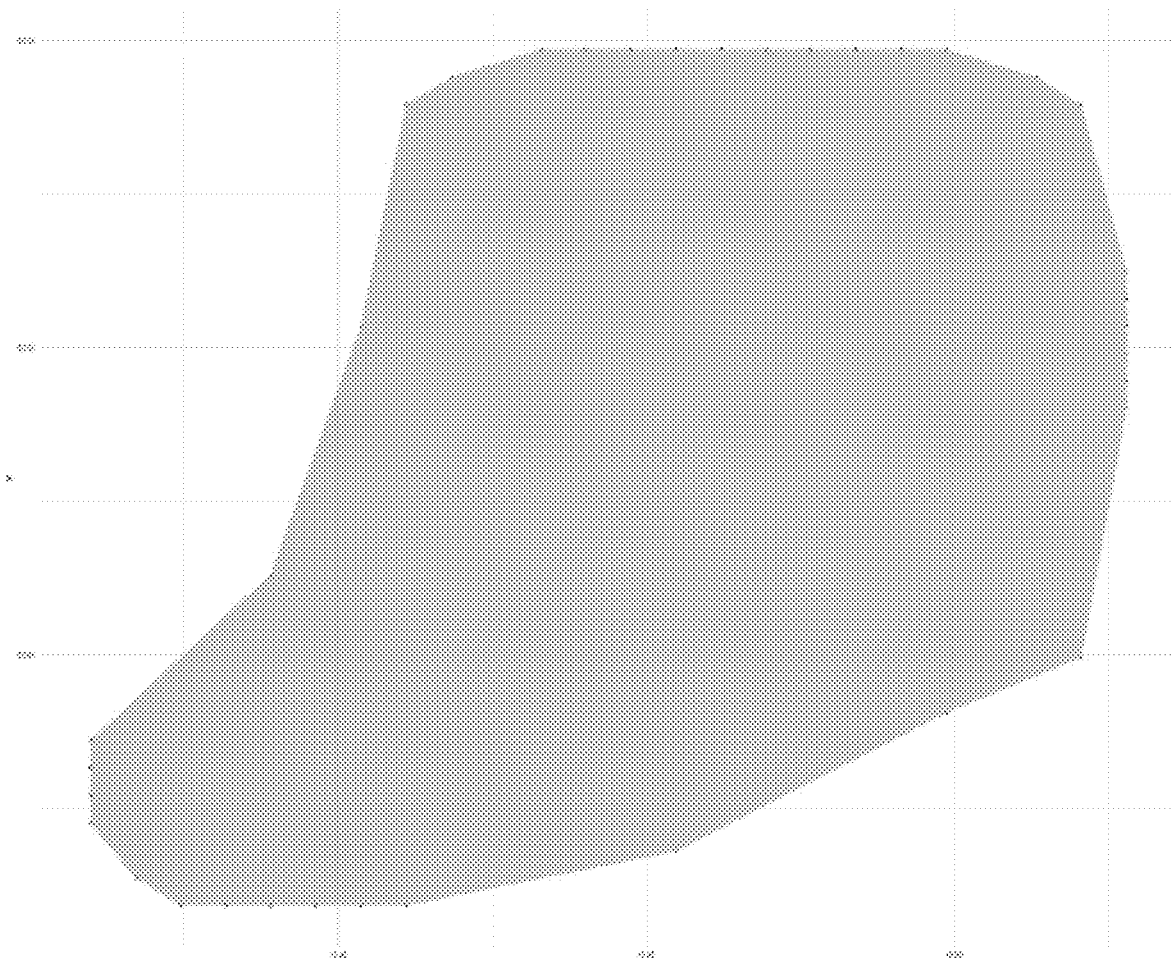
Figure 17C:
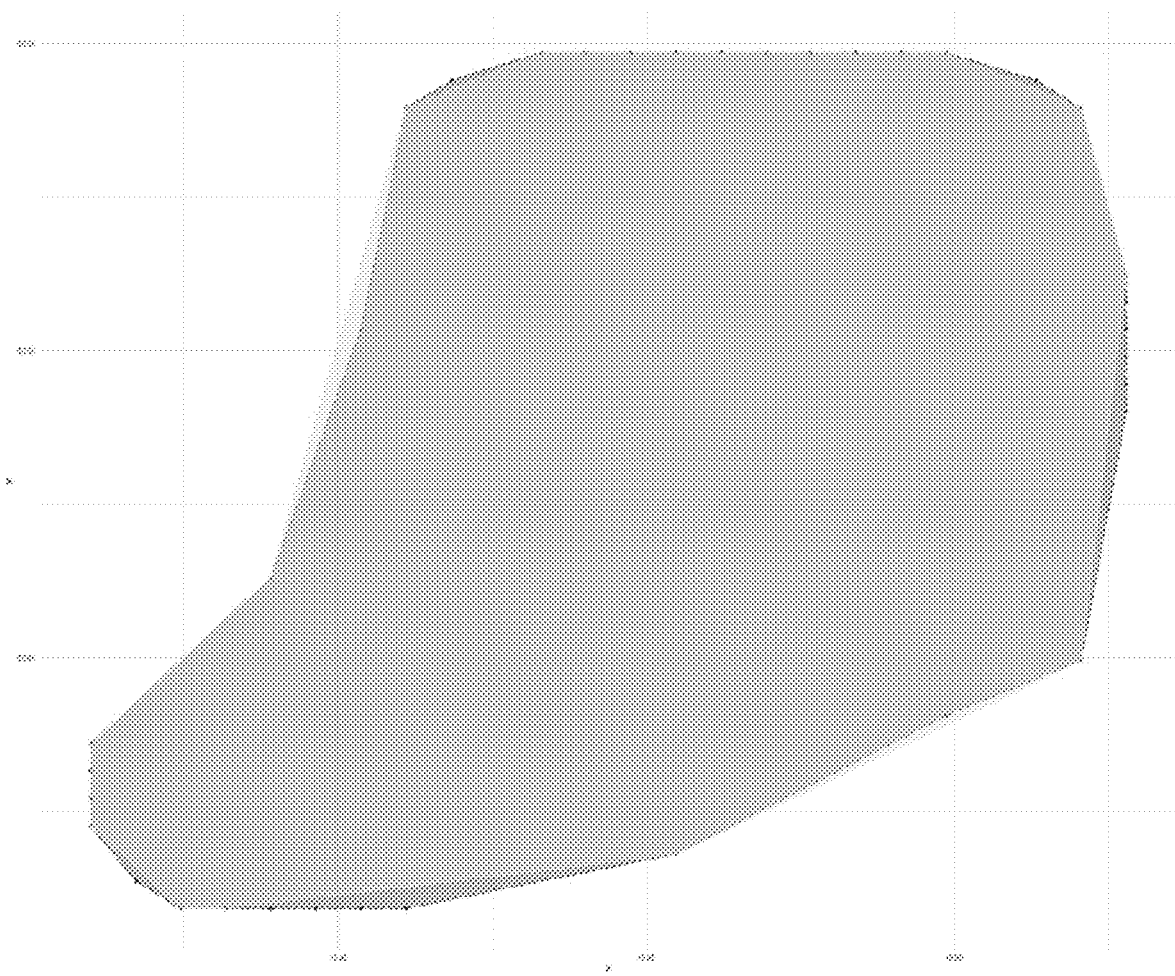

FIGS. 17A-C are a third set of examples of warning polygons, including an unconstrained polygon (FIG. 17A), a first constrained polygon (FIG. 17B) and a second constrained polygon (FIG. 17C). In particular, FIGS. 17A-C are a third set examples of polygons after applying iterative approximation with different number of vertices, with FIG. 17A comprising a polygon with 36 vertices, FIG. 17B comprising a polygon with 19 vertices, and FIG. 17C comprising a polygon with 12 vertices. As shown in FIGS. 15A-C, 16A-C and 17A-C, it is observed that while the number of vertices is significantly reduced, the overall shape of the polygon is not compromised significantly.

Figure 18:
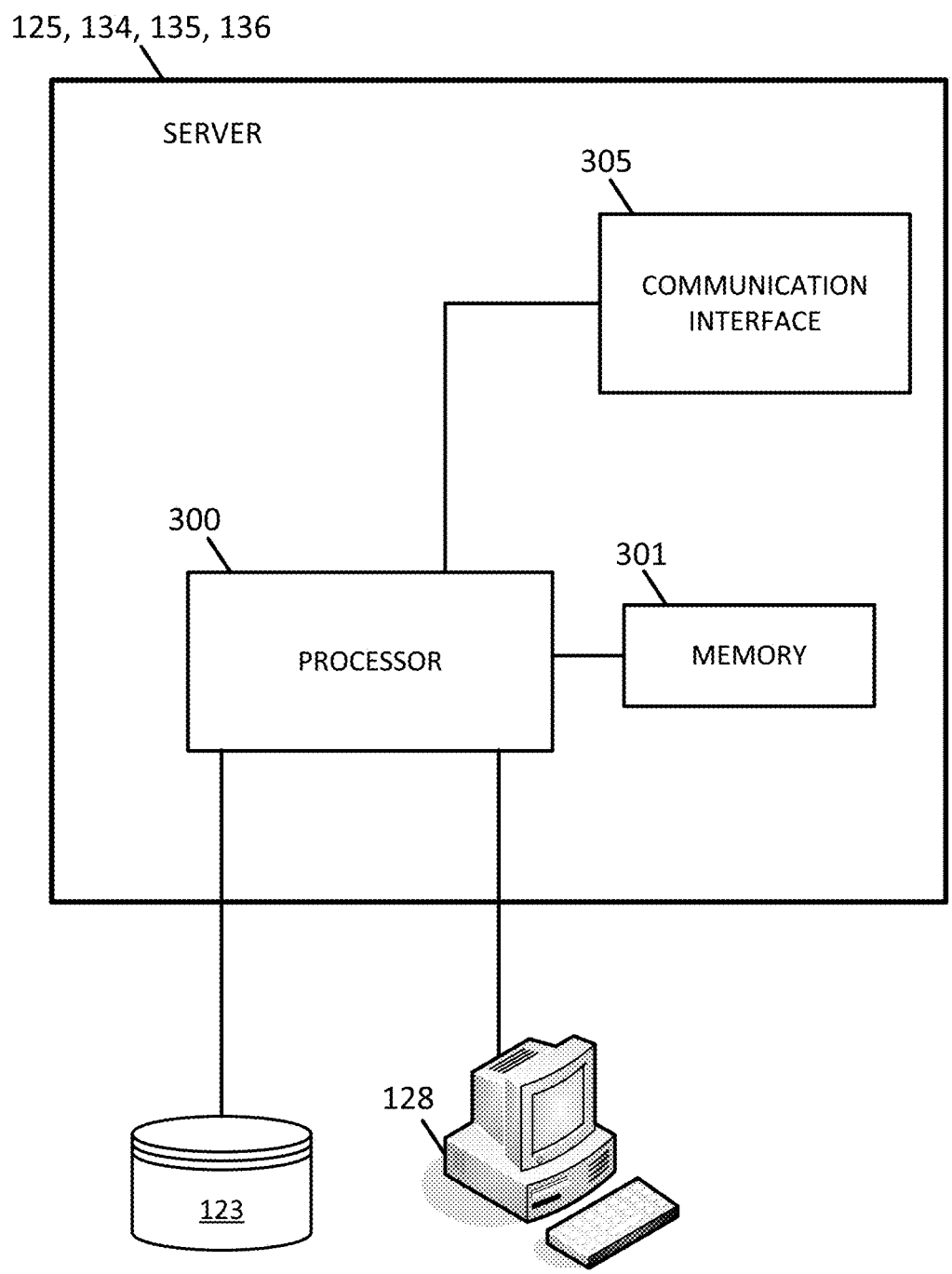
FIG. 18 illustrates an example server.

FIG. 18 illustrates an example server 125, 134, 135, 136 which may apply to the systems of FIG. 1A-C. The server 125, 134, 135, 136 includes a processor 300, a communication interface 305, a memory 301, and a database 123. The processor 300 may implement the functions associated with the map tile activator 32 and polygon generator 35 or otherwise the polygon builder 121. The communication interface 305 includes the functions associated with the input 30 and output 39. The communication interface 305 may facilitate the receipt of the probe data from the probes 101a-n as well as provide the protected probe data 33 to the external device 41. The memory 301 and/or database 123 includes the map tile database 31 and the index of activated map tiles 34. An input device (e.g., keyboard or personal computer 128) may be used to enter settings to the server 125. The settings may include settings for the confidence level threshold, the level of map tiles, and the predetermined distance for pre-activating the map tiles. Additional, different, or fewer components may be provided in the server 125, 134, 135, 136.

The communication interface 305 may include circuitry serving as a means for receiving measurement data from one or more sensors associated with the geographic region. The processor 300 may include circuity serving as means for identifying at least one location from the measurement data. The processor 300 may include circuity serving as means for identifying at least one map tile within a predetermined distance to the at least one location. The processor 300 may include circuity serving as means for defining an index including the at least one map tile in response to identification that the at least one map tile is within the predetermined distance to the at least one location. The memory 301 may be a means for storing the index including the at least one map tile. The processor 300 may include circuity serving as means for calculating a confidence level for the at least one map tile accessed from the index. The processor 300 may include circuity serving as means for comparing the confidence level for the at least one map tile to a threshold confidence level. The processor 300 may include circuity serving as means for clustering the at least one map tile in a map tile cluster in response to the confidence level exceeding the threshold confidence level. The processor 300 may include circuity serving as means for calculating a polygon based on the map tile cluster, wherein the polygon intersects the geographic region.

In one example, the server 125, 134, 135, 136 may maintain the geographic database 123 including data indicative of the weather polygons 62 indexed by geographic coordinates. A mobile device 122 may send requests for a subset of the geographic database 123 based on detected locations at the mobile device 122. Additionally or alternatively, the mobile device 122 may send requests for weather polygons from the geographic database 123 based on detected locations at the mobile device 122. The server 125 may query the geographic database 123 using the locations to retrieve the polygon 62 and return the polygon the mobile device 122. In other examples, the polygon 62 may be indexed by map tile or road segment, and the request from the mobile device may include an identifier for the map tile or road segment.

Figure 19:
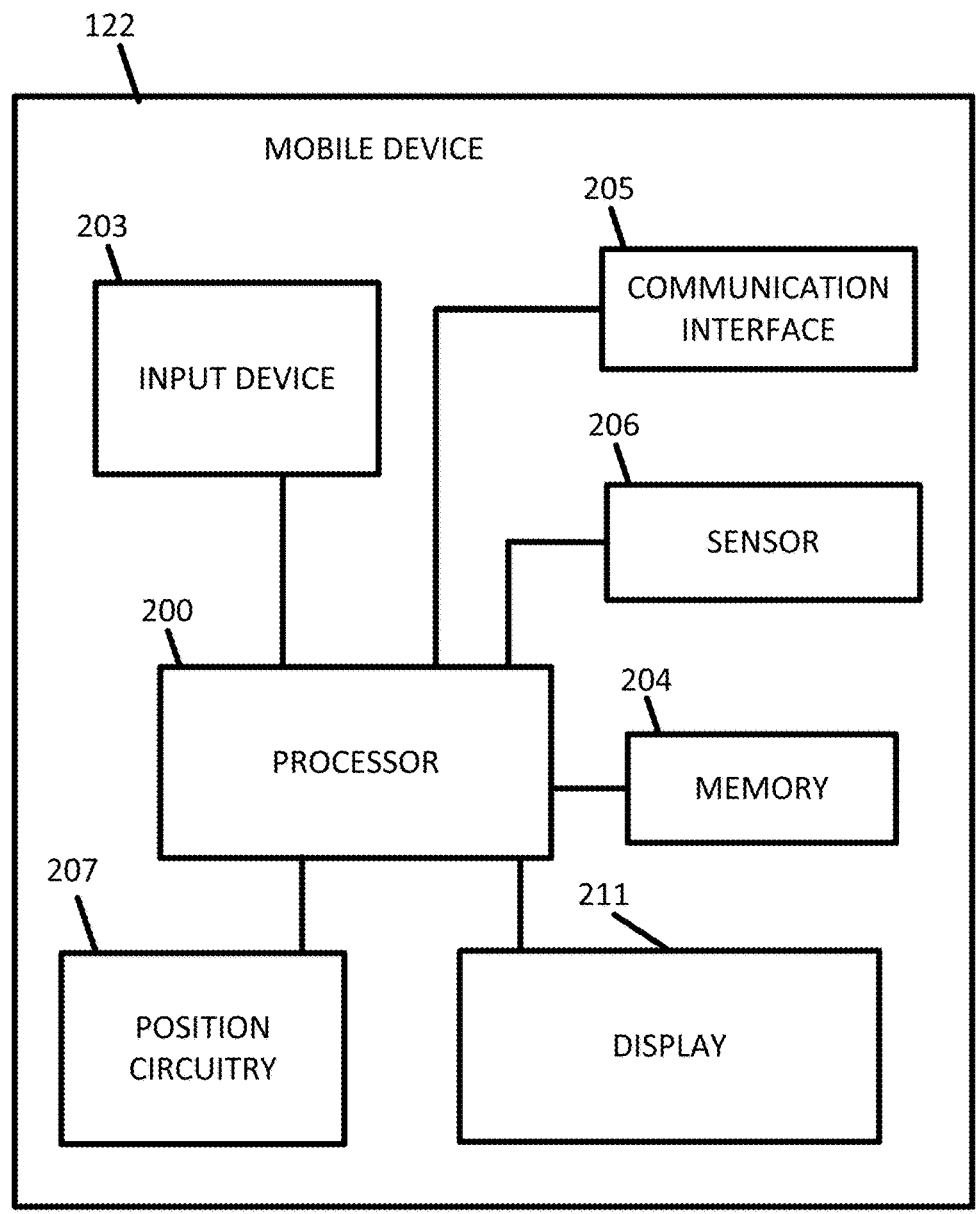
FIG. 19 illustrates an example mobile device.

FIG. 19 illustrates an exemplary mobile device 122 of the system of FIGS. 1A-C. The mobile device 122 includes a processor 200, a memory 204, an input device 203, a communication interface 205, position circuitry 207, a display 211, and a sensor 206. The input device 203 may receive commands from the user for default settings for the weather polygon generation (e.g., the confidence level threshold, the level of map tiles, and the predetermined distance for pre-activating the map tiles). The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include any of the sensors described herein including a rain sensor, a windshield wiper sensor, a fog light sensor, a vehicle system sensor, or another example. Additional, different, or fewer components are possible for the mobile device 122.

Figure 20:
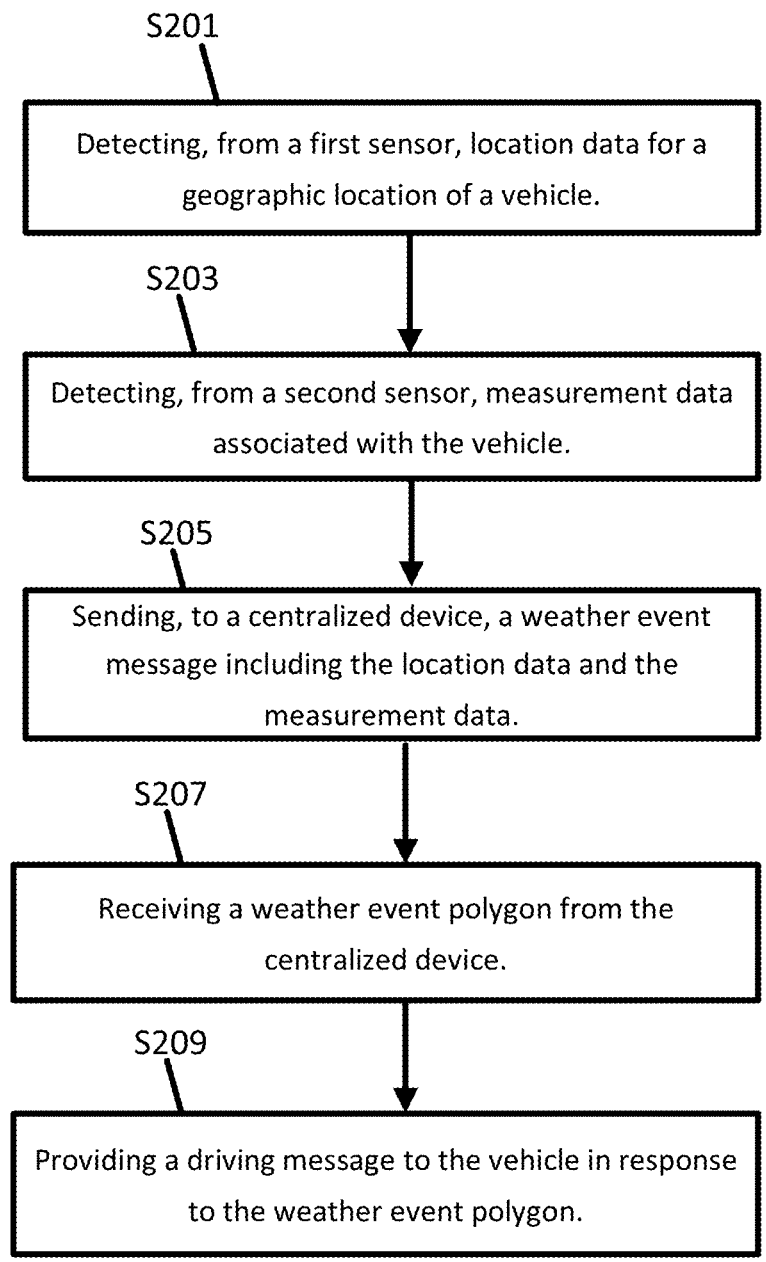
FIG. 20 illustrates an example flowchart for the mobile device of FIG. 16.

FIG. 20 illustrates an example flowchart for the operation of mobile device 122. Additional, different, or fewer acts may be provided.

At act S201, the processor 200 or the communication interface 205 receives, using position circuitry 207 (a first sensor), location data for the geographic location for mobile device 122. The position circuitry 207 detects a geographic position of the mobile device 122 or the vehicle 124. The position circuitry 207 is one example means for detecting or determining a geographic position. The processor 200 may also include circuity serving as means for detecting or determining a geographic position. The detected geographic position of the mobile device 122 may include a latitude and longitude pair. The geographic position may be detected or sampled at periodic intervals in time or distance or may be continuously detected.

At act S203, the processor 200 or the sensor 206 detects measurement data associated with the vehicle. The measurement data may include the operation of a vehicle subsystem such as the windshield wipers or the fog lights. The measurement data may describe the ambient environment of the vehicle 124 such as precipitation levels or temperature. The sensor 206 is an example means for detecting the vehicle subsystem data or the ambient environment data.

At act S205, the processor 200 or the communication interface 205 may send, to a centralized device, a weather event message including the location data and the measurement data. The centralized device may be the server 125 and/or a cloud data provider or map developer. The communication interface 205 may include circuitry as a means for sending the weather event message to the centralized device.

At act S207, the processor 200 or the communication interface 205 may receive a weather event polygon from the centralized device. The communication interface 205 may include circuitry as a means for receiving the weather event polygon. The weather event polygon may include a list of vertices (such as in a set of vertices) as geographic coordinates for defining the weather event polygon. The weather event polygon may be defined according to any of the embodiments herein including a pre-activation technique that defines a list of map tiles within a predetermined distance of, or including, any observations described in S203. The weather event polygon may be defined according to a confidence level based on an analysis of the sensor data. The weather event polygon may be defined according to a clustering technique that groups map tiles based on their relative positions.

At act S209, the display 211 or another output device provides a driving message to the vehicle in response to the weather event polygon. The driving message includes a warning to a driver of the vehicle, a driving command for operation of the vehicle, or a map including the weather event polygon. The display 211 is an example means for providing the driving message in response to the weather event polygon.

The processor 200 may include a routing module including an application specific module or integrated circuit that calculates routing between an origin and destination. The routing module is an example means for generating a route or a routing command in response to the weather polygon. The route may circumvent or otherwise be altered in response to the weather polygon. The routing command may be a driving instruction (e.g., turn left, go straight), which may be presented to a driver or passenger, or sent to an assisted driving system. The display 211 is an example means for displaying the routing command.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 21:
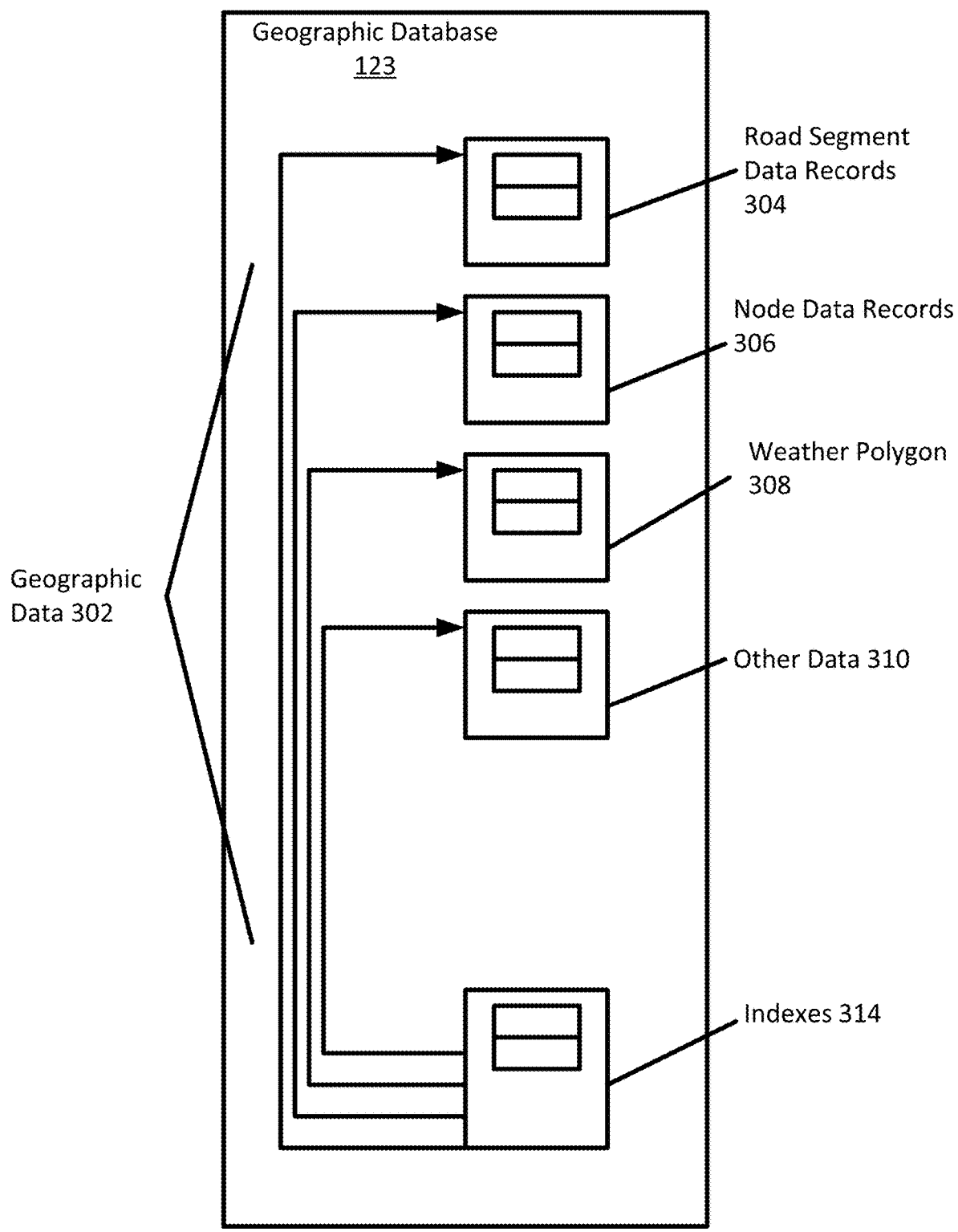
FIGS. 21 and 22 illustrate example geographic databases.

In FIG. 21, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate weather polygon data 308 with a road segment in the segment data records 304 or a geographic coordinate. An index 314 may, for example, store the weather polygon data 308 relating to one or more locations for boundaries of one or more weather polygons. The weather polygon data 308 may include a list (such as a set) of road segments, nodes, or geographic coordinates for the weather polygon.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 22:
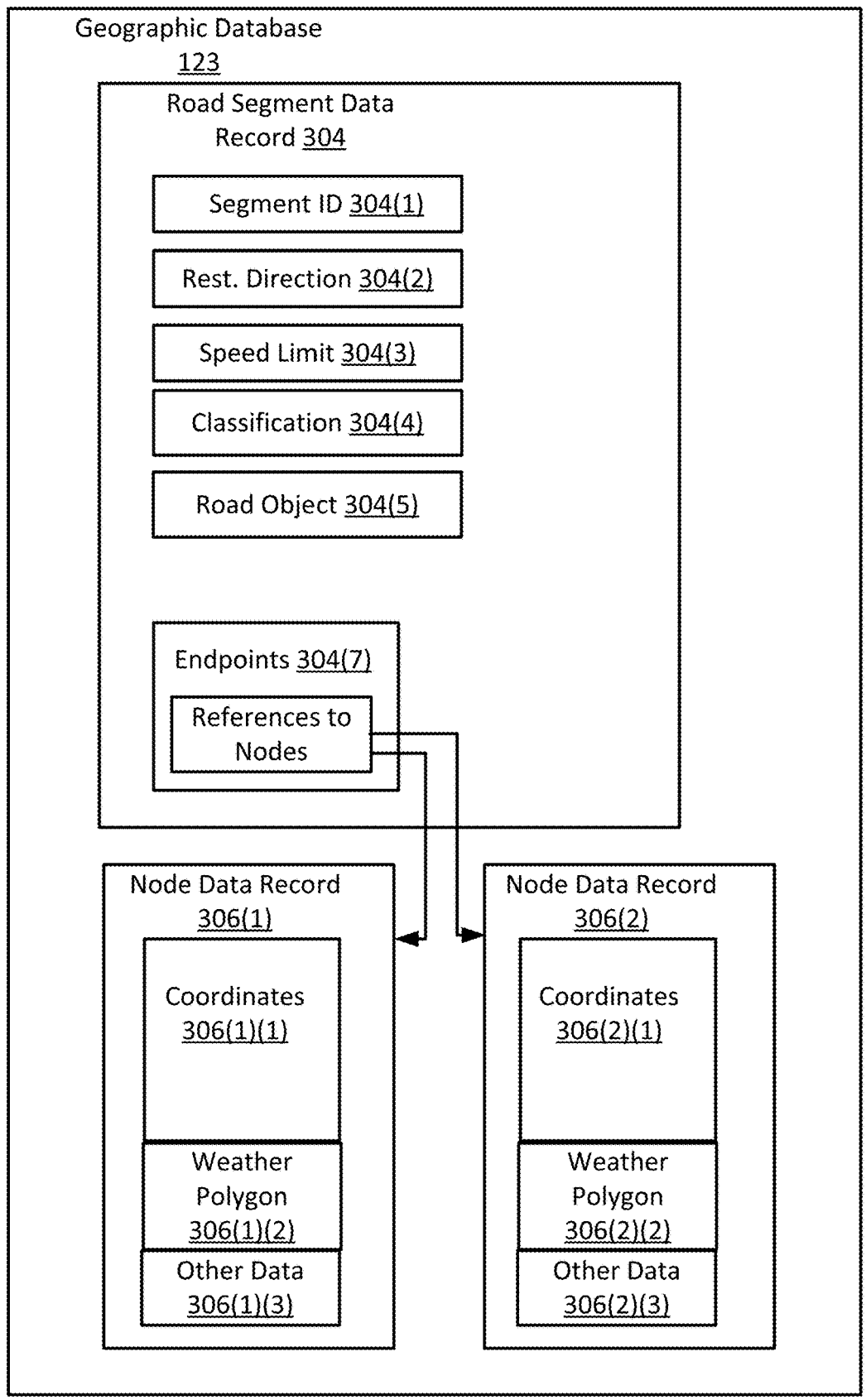

FIG. 22 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 22 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and weather polygon 306(1)(2) and 306(2)(2), which may include boundaries of the weather polygon, or road segments or nodes defining the weather polygons. The weather polygons 306 (1)(2) and 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for generating warning polygons constrained to an end-use device, the warning polygons indicative of hazard events in a geographic region, the method comprising:
  receiving measurement data from one or more sensors associated with the geographic region;
  identifying at least one location from the measurement data;
  identifying at least one map tile within a predetermined distance to the at least one location;
  generating a map tile cluster based on analysis of the at least one map tile;
  accessing an end-use constraint of the end-use device, the end-use constraint indicative of a constraint in processing on the end-use device; and
  calculating, by a processor, the warning polygon based on the map tile cluster and based on the end-use constraint, wherein the warning polygon intersects the geographic region.

Embodiment 2

The method of embodiment 1:
  wherein the end-use constraint comprises a maximum vertices limit;
  wherein the warning polygon comprises a set of vertices as geographic coordinates for defining the hazard event; and
  wherein a number of vertices in the set of vertices is constrained to be no more than the maximum vertices limit.

Embodiment 3

The method of any of embodiments 1 and 2,
  wherein calculating the warning polygon comprises:
    generating an unconstrained warning polygon based on the map tile cluster;
    determining whether the number of vertices in the set of vertices for the unconstrained warning polygon is greater than the maximum vertices limit;
    responsive to determining that the number of vertices in the set of vertices for the unconstrained warning polygon is greater than the maximum vertices limit:
      reducing the number of vertices in the set of vertices for the unconstrained warning polygon to be no more than the maximum vertices limit in order to generate a constrained warning polygon for use by the end-use device; and
    responsive to determining that the set of vertices for the unconstrained warning polygon is not greater than the maximum vertices limit, determining that the unconstrained warning polygon is for use by the end-use device.

Embodiment 4

The method of any of embodiments 1-3:
  wherein generating the constrained warning polygon comprises:
    building the set of vertices in the constrained warning polygon, from the set of vertices in the unconstrained warning polygon, until the number of vertices in the set of vertices in the constrained warning polygon is equal to the maximum vertices limit.

Embodiment 5

The method of any of embodiments 1-3:
  wherein generating the constrained warning polygon comprises:
    removing vertices from the set of vertices in the unconstrained warning polygon until the number of vertices in the set of vertices in the constrained warning polygon is equal to the maximum vertices limit.

Embodiment 6

The method of any of embodiments 1-5,
  wherein a requesting server sends a request to a polygon-generating server to generate the warning polygon;
  wherein the polygon-generating server generates the unconstrained warning polygon and sends the unconstrained warning polygon to the requesting server;
  wherein the requesting server:
  determines whether the set of vertices for the unconstrained warning polygon is greater than the maximum vertices limit;
  responsive to the requesting server determining that the set of vertices for the unconstrained warning polygon is greater than the maximum vertices limit, the requesting server:
    reduces the number of vertices in the set of vertices for the unconstrained warning polygon to be no more than the maximum vertices limit in order to generate a constrained warning polygon; and
    transmits the constrained warning polygon to the end-use device for output;
  responsive to the requesting server determining that the set of vertices for the warning polygon is not greater than the maximum vertices limit, the requesting server transmits the unconstrained warning polygon to the end-use device for output.

Embodiment 7

The method of any of embodiments 1-5:
  wherein the end-use device receives the unconstrained warning polygon;
  wherein the end-use device:
  determines whether the set of vertices for the unconstrained warning polygon is greater than the maximum vertices limit;
  responsive to the end-use device determining that the set of vertices for the unconstrained warning polygon is greater than the maximum vertices limit, the end-use device:
    reduces the number of vertices in the set of vertices for the unconstrained warning polygon to be no more than the maximum vertices limit in order to generate a constrained warning polygon; and
    outputs the constrained warning polygon;
  responsive to the end-use device determining that the set of vertices for the warning polygon is not greater than the maximum vertices limit, the end-use device outputs the unconstrained warning polygon.

Embodiment 8

The method of any of embodiments 1-5 and 7, further comprising:
  the end-use device determining the maximum vertices limit based on a current operation of the end-use device.

Embodiment 9

The method of any of embodiments 1-8, wherein the end-use constraint comprises a size associated with the warning polygon.

Embodiment 10

The method of any of embodiments 1-9, further comprising:
  receiving an indication of the end-use device; and
  determining, based on the indication, the end-use constraint of the end-use device.

Embodiment 11

The method of any of embodiments 1-10, wherein the end-use device comprises an electronic device associated with a head unit of a vehicle.

Embodiment 12

An apparatus, configured to perform and/or control the method of any of embodiments 1-11 or comprising means for performing and/or controlling any of embodiments 1-11.

Embodiment 12

An apparatus, comprising at least one processor and at least one memory including computer program code for one or more programs, the at least one memory and the computer program code configured to, with the at least one processor, to perform and/or control the method of any of embodiments 1-11.

Embodiment 13

A computer program comprising instructions operable to cause a processor to perform and/or control the method of any of embodiments 1-11, when the computer program is executed on the processor.

We claim:

1. A method for generating warning polygons constrained to an end-use device, the warning polygons indicative of hazard events in a geographic region, the method comprising:
  receiving measurement data from one or more sensors associated with the geographic region;
  identifying at least one location from the measurement data;
  identifying at least one map tile within a predetermined distance to the at least one location;
  generating a map tile cluster based on analysis of the at least one map tile;
  accessing an end-use polygon constraint of the end-use device, the end-use polygon constraint indicative of a constraint in processing on the end-use device;
  calculating, by a processor, a warning polygon based on the map tile cluster and based on the end-use polygon constraint, wherein the warning polygon intersects the geographic region, and
  wherein calculating the warning polygon comprises:
    generating an unconstrained warning polygon based on the map tile cluster; and adjusting the unconstrained warning polygon based on the end-use polygon constraint.

2. The method of claim 1, wherein the end-use polygon constraint is associated with a vehicle manufacturer or a type of vehicle.

3. The method of claim 1, wherein the end-use polygon constraint is associated with a type of navigation device.

4. The method of claim 1, further comprising:
receiving the end-use polygon constraint from a vehicle manufacturer.

5. The method of claim 1, further comprising:
storing the end-use polygon constraint in a constraint database.

6. The method of claim 5, further comprising:
receiving data indicative of a vehicle traveling in the geographic region; and
accessing the constraint database based on the data indicative of the vehicle.

7. The method of claim 6, further comprising:
sending the warning polygon to the vehicle.

8. The method of claim 1, wherein the end-use polygon constraint comprises a size associated with the warning polygon.

9. The method of claim 1, further comprising:
receiving an indication of the end-use device; and
determining, based on the indication, the end-use polygon constraint of the end-use device.

10. The method of claim 1, wherein the end-use device comprises an electronic device associated with a head unit of a vehicle.

11. An apparatus for generating warning polygons constrained to an end-use device, the warning polygons indicative of hazard events in a geographic region, the apparatus comprising:
a map tile database configured to store partitions of map data according to an index of a plurality of map tile identifiers;
an input configured to receive measurement data from one or more sensors associated with the geographic region; and
a controller configured to identify at least one location from the measurement data, identify, from the map tile database, at least one map tile within a predetermined distance to the at least one location, generate a map tile cluster based on analysis of the at least one map tile, access an end-use polygon constraint of the end-use device, the end-use polygon constraint indicative of a constraint in processing on the end-use device, and calculate a warning polygon based on the map tile cluster and based on the end-use polygon constraint, wherein the warning polygon intersects the geographic region, wherein the controller is configured to generate an unconstrained warning polygon based on the map tile cluster and adjust the unconstrained warning polygon based on the end-use polygon constraint.

12. The apparatus of claim 11, wherein the end-use polygon constraint is associated with a vehicle manufacturer or a type of vehicle.

13. The apparatus of claim 11, wherein the end-use polygon constraint is associated with capabilities of a navigation device.

14. The apparatus of claim 11, wherein the end-use polygon constraint is received from a vehicle manufacturer.

15. The apparatus of claim 11, wherein the end-use polygon constraint comprises a size associated with the warning polygon.

16. A non-transitory computer readable medium including instructions that when executed cause a processor to perform:
detecting, from a first sensor, location data for a geographic location of a vehicle;
detecting, from a second sensor, measurement data associated with the vehicle;
sending, to a centralized device, an event message including the location data and the measurement data;
receiving a hazard event polygon from the centralized device, the hazard event polygon constrained based on an unconstrained warning polygon from a map tile cluster that is adjusted according to an end-use device in the vehicle; and
outputting, using the end-use device, a driving message to the vehicle in response to receipt of the hazard event polygon.

17. The non-transitory computer readable medium of claim 16, wherein the hazard event polygon is constrained based on a vehicle manufacturer or a type of vehicle.

18. The non-transitory computer readable medium of claim 16, wherein the hazard event polygon is constrained based on a navigation device.

* * * * *